United States Patent
Szabo et al.

(10) Patent No.: US 10,454,768 B2
(45) Date of Patent: Oct. 22, 2019

(54) EXTENDING POLICY RULESETS WITH SCRIPTING

(71) Applicant: F5 NETWORKS, INC., Seattle, WA (US)

(72) Inventors: Paul I. Szabo, Shoreline, WA (US); Gennady Dosovitsky, Sunnyvale, CA (US); Ron Talmor, San Jose, CA (US); Jeroen de Borst, Sammamish, WA (US); David A. Hansen, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 233 days.

(21) Appl. No.: 14/081,963

(22) Filed: Nov. 15, 2013

(65) Prior Publication Data

US 2015/0142948 A1    May 21, 2015

(51) Int. Cl.
G06F 15/173 (2006.01)
H04L 12/24 (2006.01)

(52) U.S. Cl.
CPC .............. *H04L 41/0893* (2013.01)

(58) Field of Classification Search
None
See application file for complete search history.

(56) References Cited

U.S. PATENT DOCUMENTS 6,718,380 B1 * 4/2004 Mohaban ............ H04L 12/5695
709/223
6,983,317 B1 * 1/2006 Bishop ................ H04L 43/0811
709/223

(Continued)

FOREIGN PATENT DOCUMENTS

EP      1026867 A2 *  8/2000    ......... H04L 12/2602
EP      1026867 A2 *  8/2000    ......... H04L 41/0213

(Continued)

OTHER PUBLICATIONS

F5 Networks, "Big-IP Local Traffic Manager Concepts Version 11.4" https://support.f5.com/kb/en-us/products/big-ip_ltm/manuals/product/ltm-concepts-11-4-0.html, publication date Nov. 12, 2014, accessed on May 1, 2015 (178 pages).

(Continued)

*Primary Examiner* — Phyllis A Book
(74) *Attorney, Agent, or Firm* — John W. Branch; Lowe Graham Jones PLLC

(57) ABSTRACT

Embodiments are directed towards using policy rules that may be extended by scripting operative on a traffic management device. Each policy rule may have a condition and a corresponding action. If the condition is a script, a script engine separate from the policy engine may be employed to execute the script to determine if the condition is met. Otherwise, the policy engine may determine if the condition is met based on declarative expressions that comprise the condition. If the condition is met the action corresponding to the policy rule may be executed. Scripts may be used to compute the values of operands that may be used in one or more of the expression that comprise a condition for a policy rule. Also, the action corresponding to a policy rule may be implemented using a script that is executed by a script engine.

28 Claims, 11 Drawing Sheets

(56) References Cited

U.S. PATENT DOCUMENTS

| | | | |
|---|---|---|---|
| 7,222,175 B2 | 5/2007 | Knauerhase et al. | |
| 7,382,757 B2 | 6/2008 | LoGalbo et al. | |
| 7,616,617 B2 | 11/2009 | Pandey et al. | |
| 7,706,337 B2 | 4/2010 | Pandey et al. | |
| 7,912,804 B1* | 3/2011 | Talwar | G06Q 10/06 706/47 |
| 7,920,545 B2 | 4/2011 | Eguchi | |
| 8,001,607 B2 | 8/2011 | Stull et al. | |
| 8,144,670 B2 | 3/2012 | Shin et al. | |
| 8,149,794 B2 | 4/2012 | Shin et al. | |
| 8,196,125 B2* | 6/2012 | Maes | G06Q 10/06 717/120 |
| 8,223,662 B2 | 7/2012 | Deshpande et al. | |
| 8,305,946 B2 | 11/2012 | Kubo | |
| 8,694,642 B2 | 4/2014 | Dempsky et al. | |
| 8,726,375 B2 | 5/2014 | Ma | |
| 8,797,902 B2 | 8/2014 | Jorgensen et al. | |
| 8,804,590 B2 | 8/2014 | Nakae et al. | |
| 8,830,986 B2 | 9/2014 | Sakoda | |
| 8,850,064 B2 | 9/2014 | Mann et al. | |
| 8,892,530 B1* | 11/2014 | Campbell | G06F 21/6227 707/694 |
| 8,923,204 B2 | 12/2014 | Jorgensen et al. | |
| 8,929,238 B2 | 1/2015 | Jorgensen et al. | |
| 8,966,122 B2 | 2/2015 | Treuhaft et al. | |
| 9,025,488 B2 | 5/2015 | Jorgensen et al. | |
| 9,112,800 B2 | 8/2015 | Mann et al. | |
| 9,160,702 B2 | 10/2015 | Dempsky et al. | |
| 9,172,610 B2 | 10/2015 | Mann et al. | |
| 9,197,496 B2 | 11/2015 | Mann et al. | |
| 9,204,285 B2 | 12/2015 | Jorgensen et al. | |
| 9,204,368 B2 | 12/2015 | Chen et al. | |
| 9,210,656 B2 | 12/2015 | Mannemala et al. | |
| 9,246,798 B2 | 1/2016 | Jorgensen et al. | |
| 9,265,044 B2 | 2/2016 | Sakoda | |
| 9,282,511 B2 | 3/2016 | Kim et al. | |
| 9,282,515 B2 | 3/2016 | Joo | |
| 9,292,864 B2 | 3/2016 | Qi et al. | |
| 9,413,714 B2 | 8/2016 | Treuhaft et al. | |
| 9,419,999 B2 | 8/2016 | Ma | |
| 9,628,437 B2 | 4/2017 | Dempsky et al. | |
| 9,900,826 B2 | 2/2018 | Amini et al. | |
| 9,913,219 B2 | 3/2018 | Gong et al. | |
| 9,923,961 B2 | 3/2018 | Hentunen | |
| 9,930,693 B2 | 3/2018 | Lee et al. | |
| 2003/0067874 A1* | 4/2003 | See | H04L 12/4625 370/230.1 |
| 2003/0163579 A1 | 8/2003 | Knauerhase et al. | |
| 2003/0189932 A1 | 10/2003 | Ishikawa et al. | |
| 2004/0015579 A1* | 1/2004 | Cooper | H04L 12/2602 709/223 |
| 2005/0149940 A1* | 7/2005 | Calinescu | G06F 9/5061 718/104 |
| 2005/0198246 A1* | 9/2005 | Kegel | H04L 43/50 709/223 |
| 2006/0089964 A1 | 4/2006 | Pandey et al. | |
| 2006/0251017 A1 | 11/2006 | Bishop | |
| 2007/0038775 A1 | 2/2007 | Parekh et al. | |
| 2007/0113273 A1 | 5/2007 | Shafer et al. | |
| 2007/0150936 A1* | 6/2007 | Maes | H04L 67/10 726/1 |
| 2007/0280184 A1 | 12/2007 | Shin et al. | |
| 2007/0280237 A1 | 12/2007 | Shin et al. | |
| 2008/0002633 A1 | 1/2008 | Pandey et al. | |
| 2008/0059474 A1* | 3/2008 | Lim | G06F 21/604 |
| 2008/0201179 A1* | 8/2008 | Maes | G06Q 10/06 717/151 |
| 2008/0275829 A1 | 11/2008 | Stull et al. | |
| 2009/0089441 A1 | 4/2009 | Taylor et al. | |
| 2009/0287627 A1* | 11/2009 | Van Elburg | H04L 12/5695 706/47 |
| 2010/0031362 A1 | 2/2010 | Himberger et al. | |
| 2010/0070624 A1* | 3/2010 | Lee | H04L 43/12 709/224 |
| 2010/0122175 A1* | 5/2010 | Gupta | H04L 41/22 715/735 |
| 2010/0131646 A1 | 5/2010 | Drako | |
| 2010/0157955 A1 | 6/2010 | Liu et al. | |
| 2010/0332680 A1 | 12/2010 | Anderson et al. | |
| 2011/0231931 A1 | 9/2011 | Ma | |
| 2012/0127965 A1 | 5/2012 | Benveniste | |
| 2012/0158969 A1 | 6/2012 | Dempsky et al. | |
| 2012/0307702 A1 | 12/2012 | Nakae et al. | |
| 2013/0013739 A1 | 1/2013 | Grimault et al. | |
| 2013/0070582 A1 | 3/2013 | Joo | |
| 2013/0086237 A1 | 4/2013 | Cutler et al. | |
| 2013/0219035 A1 | 8/2013 | Detienne et al. | |
| 2013/0250832 A1 | 9/2013 | Kim et al. | |
| 2013/0275570 A1 | 10/2013 | Treuhaft et al. | |
| 2013/0287010 A1 | 10/2013 | Chen et al. | |
| 2013/0322327 A1 | 12/2013 | Jorgensen et al. | |
| 2013/0325941 A1 | 12/2013 | Mann et al. | |
| 2013/0346207 A1 | 12/2013 | Qi et al. | |
| 2014/0036746 A1 | 2/2014 | Mannemala et al. | |
| 2014/0036887 A1 | 2/2014 | Sakoda | |
| 2014/0056214 A1 | 2/2014 | Jorgensen et al. | |
| 2014/0056216 A1 | 2/2014 | Jorgensen et al. | |
| 2014/0067941 A1 | 3/2014 | Mann et al. | |
| 2014/0068100 A1 | 3/2014 | Mann et al. | |
| 2014/0068101 A1 | 3/2014 | Mann et al. | |
| 2014/0068102 A1 | 3/2014 | Mann et al. | |
| 2014/0150051 A1 | 5/2014 | Bharali et al. | |
| 2014/0195692 A1 | 7/2014 | Treuhaft et al. | |
| 2014/0208423 A1 | 7/2014 | Ma | |
| 2014/0215092 A1 | 7/2014 | Dempsky et al. | |
| 2014/0244793 A1 | 8/2014 | Jorgensen et al. | |
| 2014/0372593 A1 | 12/2014 | Mann et al. | |
| 2015/0081474 A1 | 3/2015 | Kostka et al. | |
| 2015/0088883 A1 | 3/2015 | Jorgensen et al. | |
| 2015/0095439 A1 | 4/2015 | Jorgensen et al. | |
| 2015/0127802 A1 | 5/2015 | Treuhaft et al. | |
| 2015/0163828 A1 | 6/2015 | Vandwalle et al. | |
| 2015/0215819 A1 | 7/2015 | Bosch et al. | |
| 2015/0256508 A1 | 9/2015 | Townsend et al. | |
| 2016/0021615 A1 | 1/2016 | Gong et al. | |
| 2016/0036763 A1 | 2/2016 | Dempsky et al. | |
| 2016/0150004 A1 | 5/2016 | Hentunen | |
| 2016/0234807 A1 | 8/2016 | Levy et al. | |
| 2016/0269971 A1 | 9/2016 | Kim et al. | |
| 2016/0286485 A1 | 9/2016 | Li et al. | |
| 2016/0309393 A1 | 10/2016 | Amini et al. | |
| 2017/0046237 A1 | 2/2017 | Clay et al. | |
| 2017/0118754 A1 | 4/2017 | Kang | |
| 2017/0134145 A1 | 5/2017 | Xin et al. | |
| 2017/0135120 A1 | 5/2017 | Hiremath et al. | |
| 2017/0142652 A1 | 5/2017 | Liu et al. | |
| 2017/0149671 A1 | 5/2017 | Li et al. | |
| 2017/0150419 A1 | 5/2017 | Li et al. | |
| 2017/0171819 A1 | 6/2017 | Irony et al. | |
| 2017/0201940 A1 | 7/2017 | Honnappa et al. | |
| 2017/0214677 A1 | 7/2017 | Cai et al. | |
| 2017/0238239 A1 | 8/2017 | Ong | |
| 2017/0238250 A1 | 8/2017 | Guo et al. | |
| 2017/0265130 A1 | 9/2017 | Kakani | |
| 2017/0353925 A1 | 12/2017 | Trainin | |
| 2017/0359447 A1 | 12/2017 | Chan et al. | |
| 2018/0026802 A1 | 1/2018 | Barrett et al. | |
| 2018/0145732 A1 | 5/2018 | Shen et al. | |
| 2018/0191856 A1 | 7/2018 | Chang et al. | |
| 2018/0199286 A1 | 7/2018 | Ghosh et al. | |
| 2018/0227982 A1 | 8/2018 | Singamsetty et al. | |

FOREIGN PATENT DOCUMENTS

| | | |
|---|---|---|
| EP | 2587736 A2 | 5/2013 |
| EP | 3166265 A1 | 5/2017 |
| KR | 1020030061794 A | 7/2003 |

OTHER PUBLICATIONS

F5 Networks, "Big-IP Local Traffic Manager: Monitors Reference Version 11.4" https://support.f5.com/kb/en-us/products/big-ip_ltm/

(56) References Cited

OTHER PUBLICATIONS manuals/product/ltm-monitors-reference-11-4-0.html, publication date Nov. 26, 2013, accessed on May 1, 2015 (106 pages).
F5 Networks, "Big-IP IApps Developer's Guide Version 11.4" https://support.f5.com/kb/en-us/products/big-ip_ltm/manuals/product/bigip-iapps-developer-11-4-0.html, publication date Jun. 11, 2013, accessed on May 1, 2015 (46 pages).
F5 Networks, "F5 Local Traffic Manager and Global Traffic Manager Operations Guide" https://support.f5.com/kb/en-us/products/big-ip_ltm/manuals/product/f5-ltm-gtm-operations-guide-1-0.html, publication date Jan. 21, 2015, accessed on May 1, 2015 (144 pages).
International Search Report and Written Opinion received for International Application No. PCT/US2014/065238, dated Feb. 23, 2015 (13 pages).
Extended European Search Report and Communication received for Application No. 14862584.1, dated Jun. 13, 2017 (13 pages).
Official Communication for U.S. Appl. 14/624,358 dated Apr. 25, 2017, pp. 1-14.
International Search Report and Written Opinion for International Application No. PCT/US2015/016202 dated May 15, 2015, pp. 1-7.
International Search Report and Written Opinion for International Application No. PCT/US2016/067370 dated Apr. 3, 2017, pp. 1-12.
F5 Networks, Inc., "Deploying the BIG-IP GTM for DNSSEC," https://www.f5.com/pdf/deployment-guides/gtm-dnssec-dg.pdf, Version 1.2, accessed Jan. 10, 2017, pp. 1-16.
Steve Friedl's Unixwiz.net Tech Tips, "An Illustrated Guide to the Kaminsky DNS Vulnerability," http://unixwiz.net/techtips/iguide-kaminsky-dns-vuln.html, pp. 1-13
P. Mockapetris, "Domain Names—Concepts and Facilities," https://tools.ietf.org/html/rfc1034, Nov. 1987, pp. 1-56.
P. Mockapetris, "Domain Name—Implementation and specification," https://tools.ietf.org/html/rfc1035, Nov. 1987, pp. 1-56.
R. Arends et al., "DNS Security Introduction and Requirements," https://tools.ietf.org/html/rfc4033, Mar. 2005, pp. 1-21.
R. Arends et al., "Resource Records for the DNS Security Extensions," https://tools.ietf.org/html/rfc4034, Mar. 2005, pp. 1-30.
R. Arends et al., "Protocol Modifications for the DNS Security Extensions," https://tools.ietf.org/html/rfc4035, Mar. 2005, pp. 1-54.
JH Software, Simple DNS Plus "Check DNSSEC Signatures Tool," http://support.simpledns.com/kb/a173/check-dnssec-signatures-tool.aspx, Jul. 14, 2009, pp. 1-4.
Cisco, "Preparing for DNSSEC: Best Practices, Recommendations, and Tips for Successful Implementation," http://www.cisco.com/c/en/us/about/security-center/dnssec-best-practices.html accessed Jan. 10, 2017, pp. 1-15.
N. Brownlee, "DNS+DNSSEC: System Operation, Resource Records & Packet Formats," https://www.cs.auckland.ac.nz/courses/compsci742s2c/lectures/dns-4up.pdf, 2014, pp. 1-7.
W. Wijngaards, "Unbound Validating Caching Resolver," http://meetings.ripe.net/ripe-56/presentations/Wijngaards-Unbound_DNSSEC_Validating_Resolver.pdf, May 2008, pp. 1-15.
F5 Networks, Inc., "BIG-IP DNS: Load Balancing," https://support.f5.com/content/kb/en-us/products/big-ip-dns/manuals/product/bigip-dns-load-balancing-12-0-0/_jcr_content/pdfAttach/download/file.res/BIG-IP_DNS__Load_Balancing.pdf, Version 12.0, published Aug. 12, 2016, pp. 1-40.
F5 Networks, Inc., "BIG-IP DNS: Implementations," https://support.f5.com/content/kb/en-us/products/big-ip-dns/manuals/product/bigip-dns-implementations-12-0-0/_jcr_content/pdfAttach/download/file.res/BIG-IP_DNS__Implementations.pdf, Version 12.0, published Oct. 21, 2016, pp. 1-120.
Official Communication for U.S. Appl. No. 15/472,969 dated Feb. 13, 2019, pp. 1-11.
Official Communication for U.S. Appl. No. 15/472,969 dated Aug. 27, 2018, pp. 1-32.

\* cited by examiner

US 10,454,768 B2

EXTENDING POLICY RULESETS WITH SCRIPTING

TECHNICAL FIELD

The present invention relates generally to packet traffic management and, more particularly, but not exclusively to policy rules for packet traffic management.

BACKGROUND

The increasing use of Internet based services has led to a rapid increase in the number of communication connections between client devices and server devices. Traffic management devices such as load balancers, firewalls, switches, or the like, may often be used to manage and process network traffic and network connection between and among the client and server devices. In some applications there may be thousands or millions of client and server connections that need to be managed by network traffic management devices. Often, a client device establishes a network connection with a server device by using well-known network protocols, such as Transmission Control Protocol/Internet Protocol ("TCP/IP"), User Datagram Protocol ("UDP"), or the like. Such well-known network protocols often have standard multi-step handshaking processes for establishing connections, exchanging data, and closing connections, and the like. Additionally, the expansion of the Internet has led to improvements in packet traffic management. One such advancement is the use of policy rules for determining how packet traffic may be managed. However, as the packet traffic and network applications have increased in volume and complexity, effective policy rules have also become more difficult to define and manage. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. For a better understanding of the present invention, reference will be made to the following Detailed Description, which is to be read in association with the accompanying drawings, wherein.

DETAILED DESCRIPTION

Figure 1:
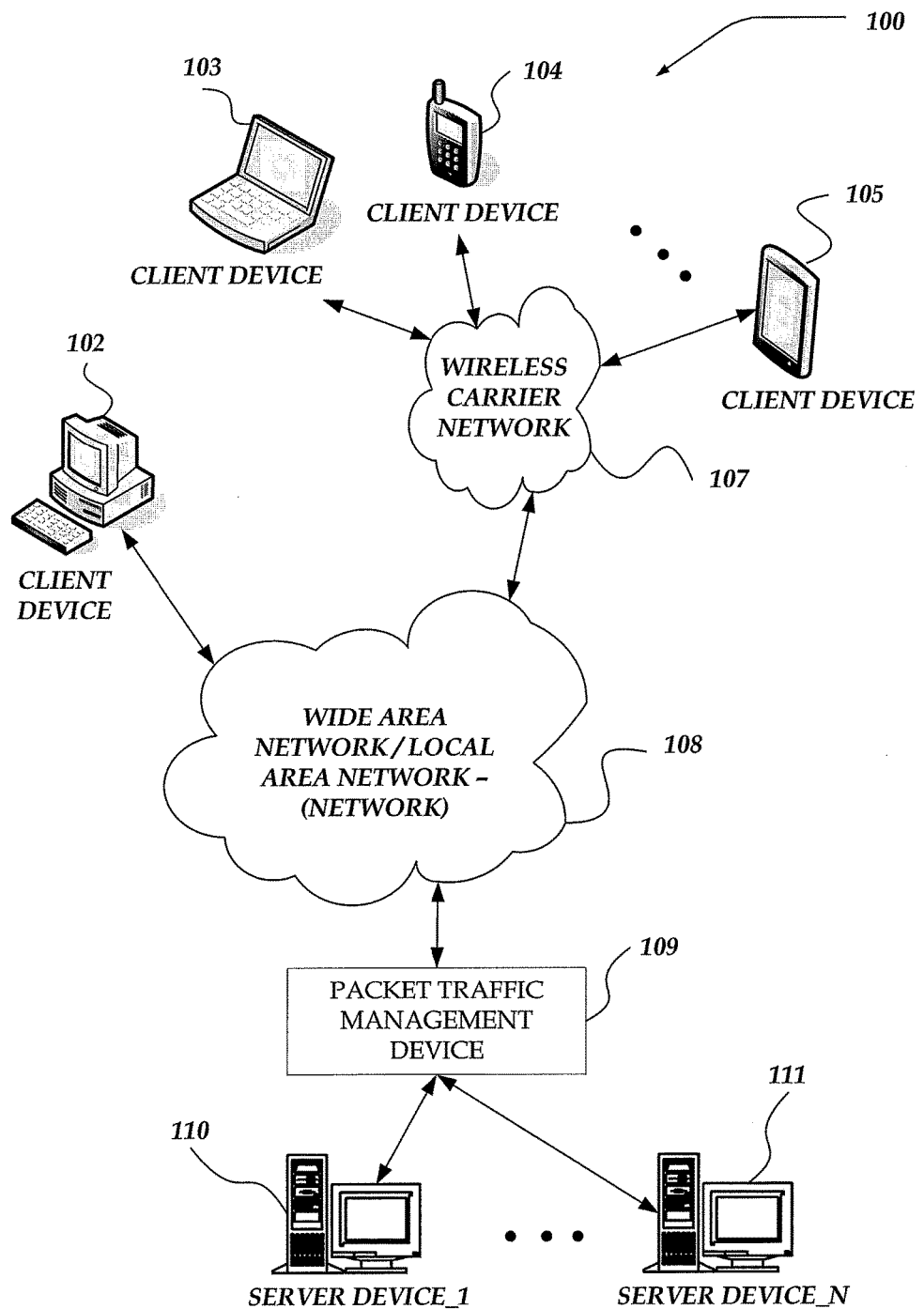
FIG. 1 is a system diagram of an environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "tuple" refers to a set of values that identify a source and destination of a connection. In one embodiment, a 5 tuple may include a source Internet Protocol (IP) address, a destination IP address, a source port number, a destination port number, VLAN identifier, tunnel identifier, routing interface identifier, physical interface identifier, or a protocol identifier. In at least one of the various embodiments, source port numbers may be a TCP source port number. Likewise, in at least one of the various embodiments, destination port number may be a TCP destination port number. In at least one of the various embodiments, tuples may be used to identify network flows (e.g., connection flows). However, a tuple need not be a 5 tuple, and other combinations of the above may also be used. For example, a tuple may be a four-tuple, using a source IP address, a destination IP address, a source port number, and a destination port number. Other combinations are also considered. Moreover, as used herein, a "flow key" refers to a tuple comprising any combination of fields selected from within a network packet header, including those fields identified above.

As used herein, the terms "network flow," "connection flow,", "flow" refer to a network session that may be established between two endpoints. In at least one of the various embodiments, a tuple may describe the flow. In at least one of the various embodiments, flows may be useful if one or more of the endpoint of a network connection may be behind a traffic management device, such as a firewall, switch, load balancer, or the like. In at least one of the various embodiments, such network flows may be used to ensure that the network packets sent between the endpoints of a flow may be routed appropriately. In at least one of the various embodiments, the performance of connection oriented network protocols such as TCP/IP may be impaired if network packets may be routed to unexpected endpoints.

As used herein the term "condition" refers to an expression of one or more simple and/or complex condition of the network traffic passing through a traffic management device. For example, the client is an unsupported web browser and is NOT on the admin network or the request URL starts with /video and the client is a mobile device and the client subnet does not match 172.27.56.0/24. Conditions may be arranged into compound conditions that include a logical expression of atomic/simple condition or compound expressions.

As used herein the term "action" refers to an operation is performed by the traffic management device if a condition is met. Thus, the condition guards whether the action will be executed. In at least one of the various embodiments, actions may be simple or complex. Also, actions may be comprised of built-in functions and values or customized scripts, or a combination thereof. In at least one of the various embodiments, examples of actions may include, rewriting URLs, logging, adding protocol headers, redirect, selected a policy, discard packets, or the like, or combination thereof.

As used herein the term "policy rule" refers to a condition and action paired together such that is a condition is met then the corresponding is executed. In at least one of the various embodiments, condition may be compound conditions comprised of multiple conditions, however, the action will execute if the evaluation of the complete condition is a true and/or affirmative results. In at least one of the various embodiments, actions may also compound actions, or in other words, multiple actions may be associated with a condition and/or a policy rule.

As used herein the term "policy ruleset" refers to a plurality of policy rules grouped together based on reasons, such as, semantic similarity, domain similarity, or the like. In at least one of the various embodiments, policy rules may be grouped into policy rulesets for any arbitrary reason to support the operational goals of a user/administrator of a traffic management device.

As used herein the term "policy engine" refers to a component of traffic management device that is arranged to process policy rulesets. In at least one of the various embodiments, a policy engine may be arranged to execute declarative expressions. Thus, in at least one of the various embodiments, conditions and actions directly execute by a policy engine are expressed using declarative programming techniques.

As used herein the term "script engine" refers to a component of traffic management device that is arranged to evaluate and execute functional and/or imperative programs (or program portions) separate from a policy engine. In at least one of the various embodiments, since policy engines may be optimized for processing declarative expressions a script engine may be employed if policy rules are extended using scripts.

As used herein the term "script" refers to a portion of source code that may use functional and/or imperative programming rather than declarative programming. Scripts may be executed on a script engine that is separate from the policy engine. In at least one of the various embodiments, policy rules may be extended using scripts. Thus, if a policy rule includes a script, the script is executed in a script engine that supports functional and/or imperative programming rather than on a policy engine that may be limited to declarative programming.

As used herein the term "operand" refers to values that may be referenced in policy rules. Operands may be accessed in scripts, conditions, actions, or the like. One or more components of a traffic management may generate the values for one or more operands. Also, scripts and actions may also create operands and/or modify their values. In at least one of the various embodiments, an operand may be an atomic value that can be referenced in rules. In at least one of the various embodiments, operands may include: simple operands (e.g. 'HTTP::uri); named operands, which act like an associative array (e.g. 'HTTP::header referer' or 'HTTP::cookie session'); indexed operands, which require an index (e.g. 'HTTP::query-parameter[1]'); or the like. In at least one of the various embodiments, operands may be typed. For example, operand types may include, string (e.g. HTTP::method), number (e.g. TCP::source-port), IP address (e.g. TCP::souce-address), Boolean, or the like. In at least one of the various embodiments, an operand reference translates to a value. In the case of a simple operand this may be the operand itself, in the case of a named operand it may be the operand+name, in the case of an indexed operand it may be the operand+index. Also, in at least one of the various embodiments, operands may belong to different domains and can have different lifetimes.

The following briefly describes the various embodiments to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards managing network traffic using policy rules that may be extended by scripting. In at least one of the various embodiments, a traffic management device may be operative to manage network communication by determining a policy rule from a plurality of policy rules (rulesets) based in part on a policy engine and at least one characteristic of the managed communications. In at least one of the various embodiments, each policy rule may have a condition and a corresponding action. In at least one of the various embodiments, if the determined condition includes a script, a script engine that may separate from the policy engine may be employed to execute the script to determine if the condition is met. Otherwise, if a script is not included in the condition, the policy engine may determine if the condition is met by, evaluating the declarative expressions that comprise the condition.

In at least one of the various embodiments, if the condition is met, the traffic management device may determine which action corresponds to the policy rule and execute it. Also, in at least one of the various embodiments, the action corresponding to a policy rule may be implemented using a script that is executed by a script engine.

In at least one of the various embodiments, scripts may be used to compute the values of operands that may be used in one or more of the expression that comprise a condition for a policy rule. In at least one of the various embodiments, if the condition for a policy rule is a declarative expression, the result of the condition may be determined used the policy engine. Also, a script that is running separate from the policy engine may be employed to determine the plurality of policy rules (policy ruleset). In at least one of the various embodiments, policy rules may be displayed in a user-interface in rows with one column for the condition and one column for the corresponding action. This display enables users to easily see and interact with the policy rules.

Illustrative Operating Environment

FIG. 1 shows components of one embodiment of an environment in which the invention may be practiced. Not all of the components may be required to practice the invention, and variations in the arrangement and type of the components may be made without departing from the spirit or scope of the invention.

As shown, system 100 of FIG. 1 includes local area networks ("LANs")/wide area networks ("WANs")-(network) 108, wireless network 107, client devices 102-105, packet traffic management device ("PTMD") 109, and server devices 110-111. Network 108 is in communication with and enables communication between client devices 102-105, wireless network 107, and PTMD 109. Wireless carrier network 107 further enables communication with wireless devices, such as client devices 103-105. PTMD 109 is in communication with network 108 and server devices 110-111.

One embodiment of client devices 102-105 is described in more detail below in conjunction with FIG. 2. In one embodiment, at least some of client devices 102-105 may operate over a wired and/or a wireless network, such as networks 107 and/or 108. Generally, client devices 102-105 may include virtually any computing device capable of communicating over a network to send and receive information, including instant messages, performing various online activities, or the like. It should be recognized that more or less client devices may be included within a system such as described herein, and embodiments are therefore not constrained by the number or type of client devices employed.

Devices that may operate as client device 102 may include devices that typically connect using a wired or wireless communications medium, such as personal computers, servers, multiprocessor systems, microprocessor-based or programmable consumer electronics, network PCs, or the like. In some embodiments, client devices 102-105 may include virtually any portable computing device capable of connecting to another computing device and receiving information, such as laptop computer 103, smart phone 104, tablet computer 105, or the like. However, portable computer devices are not so limited and may also include other portable devices, such as cellular telephones, display pagers, radio frequency ("RF") devices, infrared ("IR") devices, Personal Digital Assistants ("PDAs"), handheld computers, wearable computers, integrated devices combining one or more of the preceding devices, and the like. As such, client devices 102-105 typically range widely in terms of capabilities and features. Moreover, client devices 102-105 may provide access to various computing applications, including a browser, or other web-based applications.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages ("WAP"), and the like. In one embodiment, the browser application is enabled to employ Handheld Device Markup Language ("HDML"), Wireless Markup Language ("WML"), WMLScript, JavaScript, Standard Generalized Markup Language ("SGML"), HyperText Markup Language ("HTML"), eXtensible Markup Language ("XML"), and the like, to display and send a message. In one embodiment, a user of the client device may employ the browser application to perform various activities over a network (online). However, another application may also be used to perform various online activities.

Client devices 102-105 also may include at least one other client application that is configured to receive and/or send data between another computing device. The client application may include a capability to send and/or receive content, or the like. The client application may further provide information that identifies itself, including a type, capability, name, or the like. In one embodiment, client devices 102-105 may uniquely identify themselves through any of a variety of mechanisms, including a phone number, Mobile Identification Number ("MIN"), an electronic serial number ("ESN"), or other mobile device identifier. The information may also indicate a content format that the mobile device is enabled to employ. Such information may be provided in a network packet, or the like, sent between other client devices, PTMD 109, server devices 110-111, or other computing devices.

Client devices 102-105 may further be configured to include a client application that enables an end-user to log into an end-user account that may be managed by another computing device, such as server devices 110-111, or the like. Such end-user account, in one non-limiting example, may be configured to enable the end-user to manage one or more online activities, including in one non-limiting example, search activities, social networking activities, browse various websites, communicate with other users, participate in gaming, interact with various applications, or the like. However, participation in online activities may also be performed without logging into the end-user account.

Wireless carrier network 107 is configured to couple client devices 103-105 and its components with network 108. Wireless carrier network 107 may include any of a variety of wireless sub-networks that may further overlay stand-alone ad-hoc networks, and the like, to provide an infrastructure-oriented connection for client devices 102-105. Such sub-networks may include mesh networks, Wireless LAN ("WLAN") networks, cellular networks, and the like. In one embodiment, the system may include more than one wireless network.

Wireless carrier network 107 may further include an autonomous system of terminals, gateways, routers, and the like connected by wireless radio links, and the like. These connectors may be configured to move freely and randomly and organize themselves arbitrarily, such that the topology of wireless carrier network 107 may change rapidly.

Wireless carrier network 107 may further employ a plurality of access technologies including 2nd (2G), 3rd (3G), 4th (4G) $5^{th}$ (5G) generation radio access for cellular systems, WLAN, Wireless Router ("WR") mesh, and the like. Access technologies such as 2G, 3G, 4G, 5G, and future access networks may enable wide area coverage for mobile devices, such as client devices 103-105 with various degrees of mobility. In one non-limiting example, wireless carrier network 107 may enable a radio connection through a radio network access such as Global System for Mobil communication ("GSM"), General Packet Radio Services ("GPRS"), Enhanced Data GSM Environment ("EDGE"), code division multiple access ("CDMA"), time division multiple access ("TDMA"), Wideband Code Division Multiple Access ("WCDMA"), High Speed Downlink Packet Access ("HSDPA"), Long Term Evolution ("LTE"), and the like. In essence, wireless carrier network 107 may include virtually any wireless communication mechanism by which information may travel between client devices 103-105 and another computing device, network, and the like.

Network 108 is configured to couple network devices with other computing devices, including, server devices 110-111 through PTMD 109, client device 102, and client devices 103-105 through wireless network 107. Network 108 is enabled to employ any form of computer readable media for communicating information from one electronic device to another. Also, network 108 can include the Internet in addition to LANs, WANs, direct connections, such as through a universal serial bus ("USB") port, other forms of computer readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 108 may be configured to transport information of an Internet Protocol ("IP"). In essence, network 108 includes any communication method by which information may travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of PTMD 109 is described in more detail below in conjunction with FIG. 3. Briefly, however, PTMD 109 may include virtually any network device capable of managing network traffic between client devices 102-105 and server devices 110-111. Such devices include, for example, routers, proxies, firewalls, load balancers, cache devices, devices that perform network address translation, or the like, or any combination thereof. PTMD 109 may perform the operations of routing, translating, switching packets, or the like. In one embodiment, PTMD 109 may inspect incoming network packets, and may perform an address translation, port translation, a packet sequence translation, and the like, and route the network packets based, at least in part, on the packet inspection. In some embodiments, PTMD 109 may perform load balancing operations to determine a server device to direct a request. Such load balancing operations may be based on network traffic, network topology, capacity of a server, content requested, or a host of other traffic distribution mechanisms.

PTMD 109 may include a control segment and a separate data flow segment. The control segment may include software-optimized operations that perform high-level control functions and per-flow policy enforcement for packet traffic management. In at least one of the various embodiments, the control segment may be configured to manage connection flows maintained at the data flow segment. In one embodiments, the control segment may provide instructions, such as, for example, a packet translation instruction, to the data flow segment to enable the data flow segment to route received packets to a server device, such as server device 110-111. The data flow segment may include hardware-optimized operations that perform statistics gathering, per-packet policy enforcement (e.g., packet address translations), high-speed flow caches, or the like, on connection flows maintained at DFS between client devices, such as client devices 102-105, and server devices, such as server devices 110-111.

Server devices 110-111 may include virtually any network device that may operate as a website server. However, server devices 110-111 are not limited to website servers, and may also operate as messaging server, a File Transfer Protocol (FTP) server, a database server, content server, or the like. Additionally, each of server devices 110-111 may be configured to perform a different operation. Devices that may operate as server devices 110-111 include various network devices, including, but not limited to personal computers, desktop computers, multiprocessor systems, microprocessor-based or programmable consumer electronics, network PCs, server devices, network appliances, and the like.

Although FIG. 1 illustrates server devices 110-111 as single computing devices, the invention is not so limited. For example, one or more functions of each of server devices 110-111 may be distributed across one or more distinct network devices. Moreover, server devices 110-111 are not limited to a particular configuration. Thus, in one embodiment, server devices 110-111 may contain a plurality of network devices that operate using a master/slave approach, where one of the plurality of network devices of server devices 110-111 operate to manage and/or otherwise coordinate operations of the other network devices. In other embodiments, the server devices 110-111 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
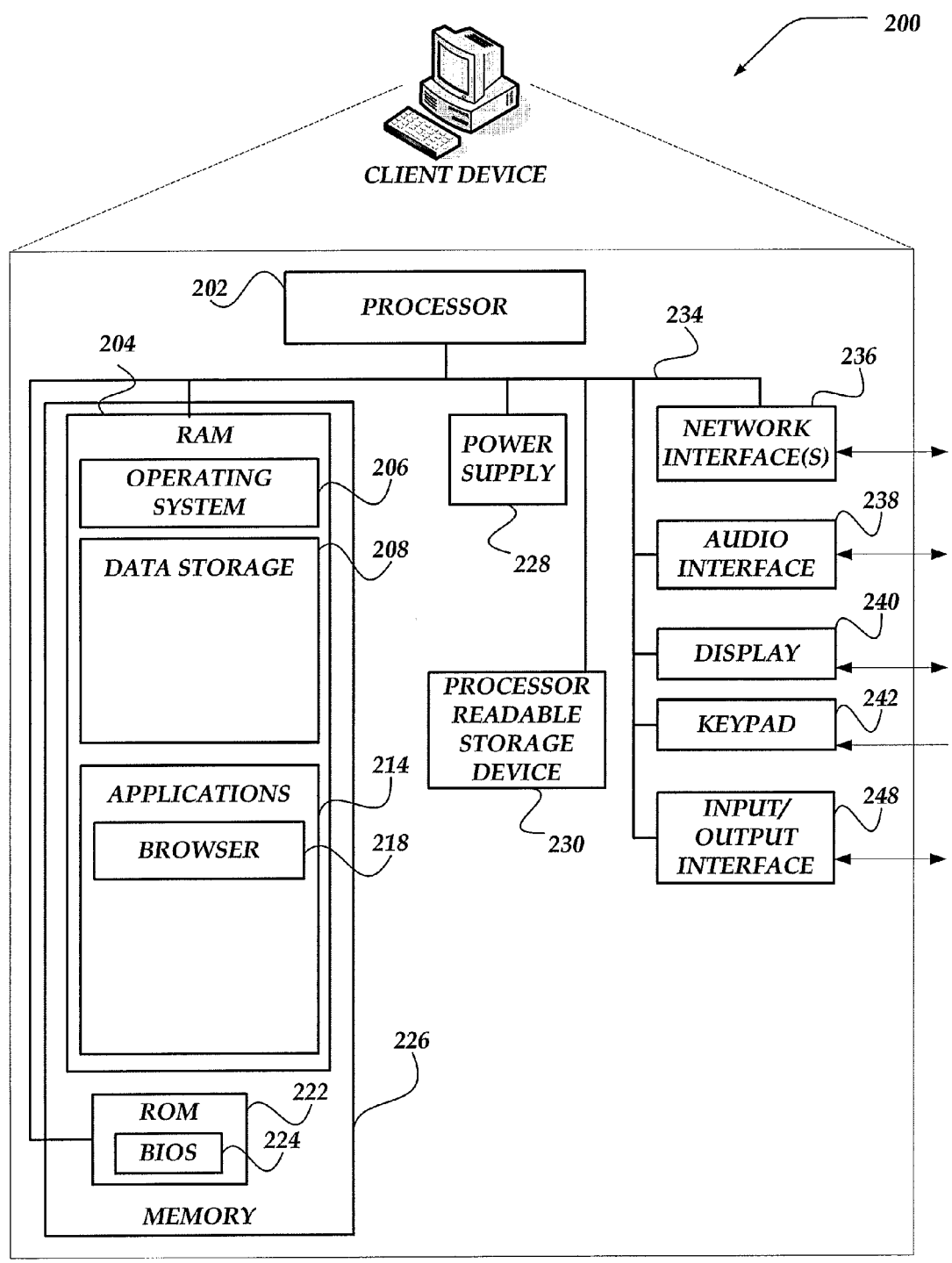
FIG. 2 shows an embodiment of a client device that may be included in a system such as that shown in FIG. 1.

FIG. 2 shows one embodiment of client device 200 that may be included in a system implementing embodiments of the invention. Client device 200 may include many more or less components than those shown in FIG. 2. However, the components shown are sufficient to disclose an illustrative embodiment for practicing the present invention. Client device 200 may represent, for example, one embodiment of at least one of client devices 102-105 of FIG. 1.

As shown in the figure, client device 200 includes a processor 202 in communication with memory 226 via a bus 234. Client device 200 also includes a power supply 228, one or more network interfaces 236, an audio interface 238, a display 240, a keypad 242, and an input/output interface 248.

Power supply 228 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, global system for mobile communication ("GSM"), code division multiple access ("CDMA"), time division multiple access ("TDMA"), High Speed Downlink Packet Access ("HSDPA"), Long Term Evolution ("LTE"), user datagram protocol ("UDP"), transmission control protocol/Internet protocol ("TCP/IP"), short message service ("SMS"), general packet radio service ("GPRS"), WAP, ultra wide band ("UWB"), IEEE 802.16 Worldwide Interoperability for Microwave Access ("WiMax"), session initiated protocol/real-time transport protocol ("SIP/RTP"), or any of a variety of other wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display ("LCD"), gas plasma, light emitting diode ("LED"), or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Client device 200 may also include a GPS transceiver (not shown) to determine the physical coordinates of client device 200 on the surface of the Earth. A GPS transceiver typically outputs a location as latitude and longitude values. However, the GPS transceiver can also employ other geo-positioning mechanisms, including, but not limited to, tri-angulation, assisted GPS ("AGPS"), Enhanced Observed Time Difference ("E-OTD"), Cell Identifier ("CI"), Service Area Identifier ("SAT"), Enhanced Timing Advance ("ETA"), Base Station Subsystem ("BSS"), or the like, to further determine the physical location of client device 200 on the surface of the Earth. It is understood that under different conditions, a GPS transceiver can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control ("MAC") address, IP address, or the like.

Memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store social networking information including address books, buddy lists, aliases, user profile information, or the like. Further, data storage 208 may also store message, we page content, or any of a variety of user generated content. At least a portion of the information may also be stored on another component of network device 200, including, but not limited to processor readable storage device 230, a disk drive or other computer readable storage medias (not shown) within client device 200.

Processor readable storage device 230 may include volatile, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD") or other optical storage, magnetic cassettes, magnetic tape, magnetic disk storage or other magnetic storage devices, or any other physical medium which can be used to store the desired information and which can be accessed by a computing device. Processor readable storage device 230 may also be referred to herein as computer readable storage media.

Applications 214 may include computer executable instructions which, when executed by client device 200, transmit, receive, and/or otherwise process network data. Network data may include, but is not limited to, messages (e.g., SMS, Multimedia Message Service ("MMS"), instant message ("IM"), email, and/or other messages), audio, video, and enable telecommunication with another user of another client device. Applications 214 may include, for example, browser 218. Applications 214 may include other applications, which may include, but are not limited to, calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth.

Browser 218 may include virtually any application configured to receive and display graphics, text, multimedia, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client device 200 to communicate with another network device, such as PTMD 109 and/or indirectly with server devices 110-111.

Illustrative Network Device

Figure 3:
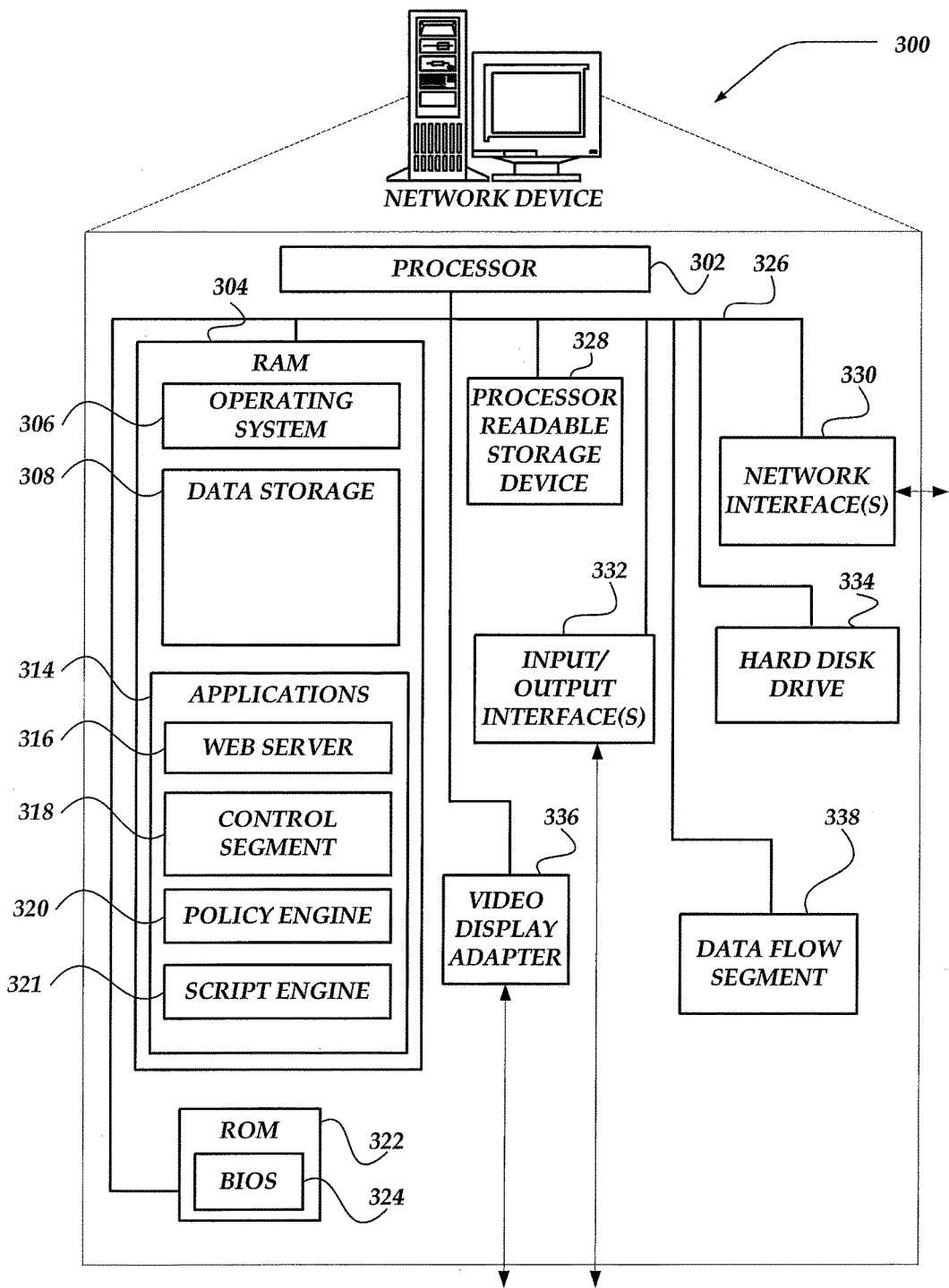
FIG. 3 shows an embodiment of a network device that may be included in a system such as that shown in FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, client, peer, a host, or any other device. Network device 300 may represent, for example PTMD 109 of FIG. 1, server devices 110-111 of FIG. 1, and/or other network devices.

Network device 300 includes processor 302, processor readable storage device 328, network interface unit 330, an input/output interface 332, hard disk drive 334, video display adapter 336, data flow segment ("DFS") 338 and a mass memory, all in communication with each other via bus 326. The mass memory generally includes RAM 304, ROM 322 and one or more permanent mass storage devices, such as hard disk drive 334, tape drive, optical drive, and/or floppy disk drive. The mass memory stores operating system 306 for controlling the operation of network device 300. Any general-purpose operating system may be employed. Basic input/output system ("BIOS") 324 is also provided for controlling the low-level operation of network device 300. As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card ("NIC").

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

The mass memory as described above illustrates another type of computer readable media, namely computer readable storage media and/or processor readable storage media, including processor readable storage device 328. Processor readable storage device 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Data storage 308 may include a database, text, spreadsheet, folder, file, or the like, that may be configured to maintain and store user account identifiers, user profiles, email addresses, IM addresses, and/or other network addresses; or the like. Data stores 308 may further include program code, data, algorithms, and the like, for use by a processor, such as central processing unit 302 to execute and perform actions. In one embodiment, at least some of data store 308 might also be stored on another component of network device 300, including, but not limited to processor-readable storage device 328, hard disk drive 334, or the like.

The mass memory may also stores program code and data. One or more applications 314 may be loaded into mass memory and run on operating system 306. Examples of application programs may include transcoders, schedulers, calendars, database programs, word processing programs, Hypertext Transfer Protocol ("HTTP") programs, customizable user interface programs, IPSec applications, encryption programs, security programs, SMS message servers, IM message servers, email servers, account managers, and so forth. Web server 316 and control segment ("CS") 318 may also be included as application programs within applications 314.

Web server 316 represent any of a variety of services that are configured to provide content, including messages, over a network to another computing device. Thus, web server 316 includes, for example, a web server, a File Transfer Protocol ("FTP") server, a database server, a content server, or the like. Web server 316 may provide the content including messages over the network using any of a variety of formats including, but not limited to WAP, HDML, WML, SGML, HTML, XML, Compact HTML ("cHTML"), Extensible HTML ("xHTML"), or the like. Web server 316 may also be configured to enable a user of a client device, such as client devices 102-105 of FIG. 1, to browse websites, upload user data, or the like.

Network device 300 may also include DFS 338 for maintaining connection flows between client devices, such as client devices 102-105 of FIG. 1, and server devices, such as server devices 110-111 of FIG. 1. In one embodiment, DFS 338 may include hardware-optimized operations for packet traffic management, such as repetitive operations associated with packet traffic management. For example, DFS 338 may perform statistics gathering, per-packet policy enforcement (e.g., packet address translations), or the like, on connection flows maintained at DFS 338. In some embodiments, DFS 338 may route, switch, forward, and/or otherwise direct packets based on rules for a particular connection flow signature (e.g., a 5 tuple of a received packet). Thus, DFS 338 may include capabilities and perform tasks such as that of a router, a switch, a routing switch, or the like. In some embodiments, the rules for a particular connection flow signature may be based on instructions received from CS 318. In one embodiment, DFS 338 may store the instructions received from CS 318 in a local memory as a table or some other data structure. In some other embodiments, DFS 338 may also store a flow state table to indicate a state of current connection flows maintained at DFS 338. In at least one of the various embodiments, components of DFS 338 may comprise and/or work in combination to provide high-speed flow caches for optimizing packet traffic management. In at least one of the various embodiments, DFS 338 may comprise high-speed memory such as SRAM to improve performance.

In at least one of the various embodiments, policy engine 320 may be a component arranged for processing and executing declarative policy rules. Policy engine 320 may be implemented in software or hardware, or a combination thereof. Script engine 321 may be a component arranged for processing and/or executing scripts. Scripts used by script engine 321 are not limited to declarative expressions. In at least one of the various embodiments, script engine 321 may process and/or execute scripts written using one or more programming languages. Also, script engine 321 may execute scripts using functional and/or imperative programming techniques.

Illustrative Logical System Architecture

Figure 4:
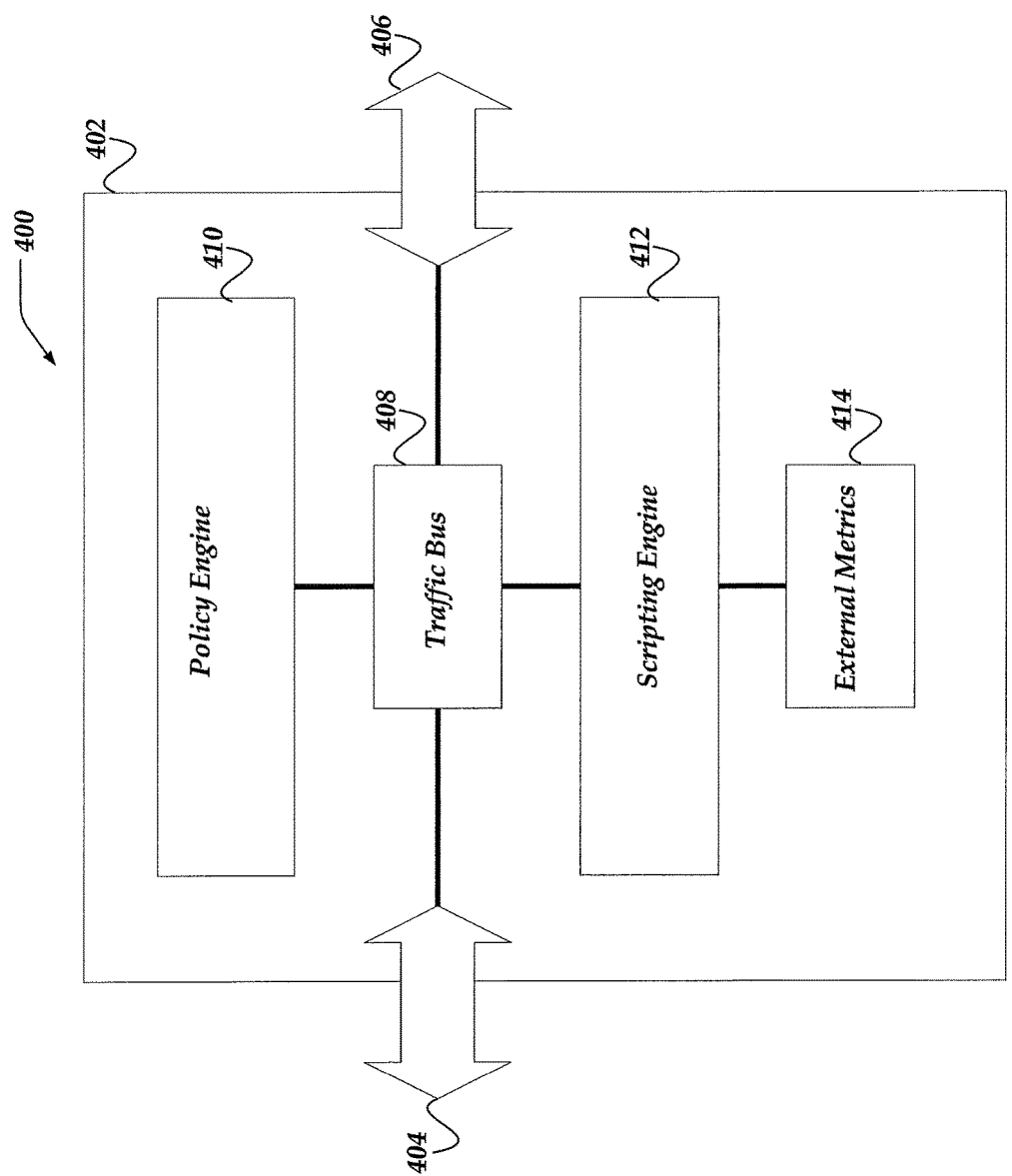
FIG. 4 illustrates a logical architecture of a system for extending policy rulesets with scripting in accordance with at least one of the embodiments.

FIG. 4 illustrates a portion of logical architecture 400 for extending policy rulesets with scripting in accordance with at least one of the embodiments. In at least one of the various embodiments, architecture 400, includes a system, such as, system 402. In at least one of the various embodiments, system 402 may be a traffic management device, a component of a traffic management device, or the like. Further, in at least one of the various embodiments, system 402 may be operative in one or more virtual machines and/or operative in a cloud based environment.

In at least one of the various embodiments, network traffic 404 may be provided to system 402 using one or more network interfaces, such as, network interfaces 330 in FIG. 3. After processing, network traffic passing through system 402 may exit by way of network interface 406. In at least one of the various embodiments, network traffic may include one or more network flows, connection flows, half-connection flows, or the like, or combination thereof. Further, in at least one of the various embodiments, network traffic may flow in both directions, with some portion of the network traffic entering and/or exiting from either or both network interface 404 or network interface 406.

In at least one of the various embodiments, system 402 may include traffic bus 408 that may be arranged so the network traffic passing through system 402 goes through bus 408. In at least one of the various embodiments, bus 408 may be comprised of multiple electronic hardware and/or software components having one or more network paths that enable network traffic to flow through system 402.

In at least one of the various embodiments, policy engine 410 may be integrated into system 402 such that it can monitor and access the network flows that may be passing through bus 408. In at least one of the various embodiments, policy engine 410 may be arranged to access some or all of the network traffic passing through traffic bus 408.

In at least one of the various embodiments, policy engine 410 may be arranged to execute policies that may be expressed using declarative expressions. In at least one of the various embodiments, declarative expressions may comprise operands, operators, and functions that have been pre-declared either as part of policy engine 410 or in one or more components for network device 300, such as, policy engine 320.

In at least one of the various embodiments, policy engine 410 may be arranged to access one or more values in the traffic management device that represent the status and/or characteristics of the network flows that may be passing through traffic bus 408. In some case, these values may be stored in buffers, registers, memory, or the like, implemented in software or hardware, or a combination thereof. In at least one of the various embodiments, the values may be associated with names and/or identifiers such that they may be used in declarative expressions created by users.

In at least one of the various embodiments, scripting engine 412 may be integrated into system 402 such that it can monitor and access the network flows that may be passing through bus 408. In at least one of the various embodiments, policy engine 410 may be arranged to access some or all of the network traffic passing through traffic bus 408.

In at least one of the various embodiments, scripting engine 412 may be arranged to execute source code provided by a user. In at least one of the various embodiments, the provided source code may be written in various well-known computer programming languages such as, JavaScript, Perl, Python, Lua, C, C++, Tel, custom programming languages, C#, or the like. Also, in at least one of the various embodiments, script engine 412 may be arranged to compile (if necessary) and execute custom programming languages designed for specific applications, including but not limited to Just In Time (JIT) compilation of scripts and/or source code.

Further, in at least one of the various embodiments, script engine 412 may be arranged to be responsive to one or more programming languages and/or source code formats. At run-time, when the script is deployed to the TMD, the script engine may determine the appropriate compiler and run-time engine based on various factors, including, user supplied meta-data/parameters, the programming language (e.g., determining the programming from the source code), file extensions (e.g., .js, java, .sh, or the like), or the like, or combination thereof.

In at least one of the various embodiments, the policy rule being processed may include an attribute that indicates which programming language was used. Also, in at least one of the various embodiments, a default programming language may be defined based on configuration values, and/or user input.

In at least one of the various embodiments, script engine 412 may be arranged to enable scripts to be generated that may access values and perform operations other than those declared for use by policy engine 410. In other words, script engine 412 enables users to generate scripts using functional programming and/or imperative programming. Further, in at least one of the various embodiments, these scripts may execute outside the policy engine and they may access values and operations that may be unavailable to the policy engine.

In at least one of the various embodiments, external metrics 414 may be a component that may generate one or more metrics that may be external to the network traffic and flows that may be passing through traffic bus 408. In at least one of the various embodiments, external metrics may include information regarding systems and components on-board system 402 as well as systems and components that may be off-board, including metrics from separate network devices, client devices, networks, or the like. In at least one of the various embodiments, external metrics 414 may include, CPU load, memory utilization, temperature, time of day, or the like.

One of ordinary skill in the art will appreciate that architecture 400 and system 402 is a simplified representation of a traffic management device arranged in accordance with at least one of the various embodiments. As such, many components necessary for an operative traffic management device are not illustrated. However, architecture 400 and system 402 as shown enable one of ordinary skill the art to understand and practice at least the innovations disclosed herein.

Figure 5:
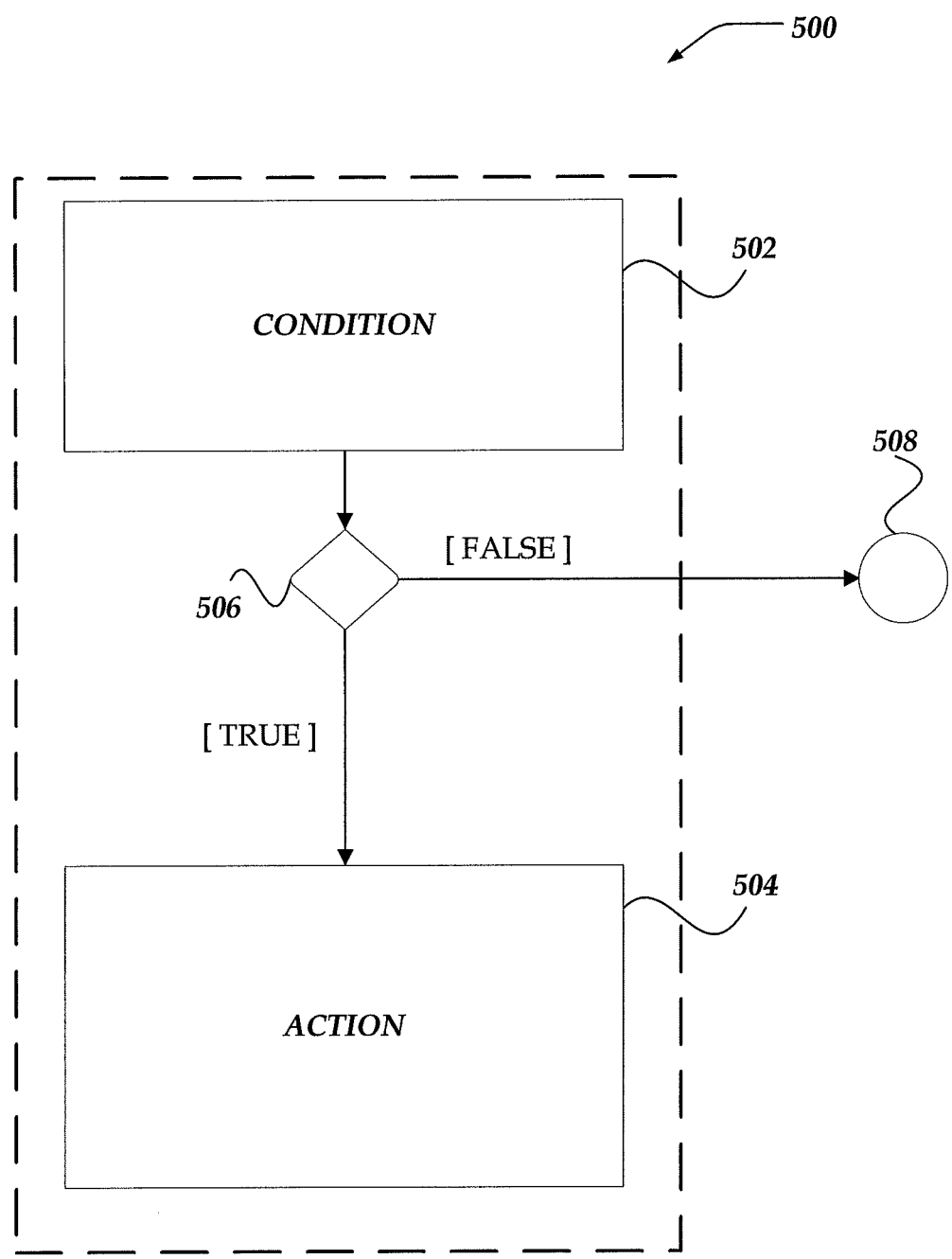
FIG. 5 illustrates a logical policy rule in accordance with at least one of the embodiments.

FIG. 5 illustrates policy rule 500 that may be extended with scripting in accordance with at least one of the embodiments. In at least one of the various embodiments, policy rules, such as, policy rule 500, may include a condition, such as, condition 500 and an action, such as, action 504. In at least one of the various embodiments, condition 502 may be arranged to generate a true or false result, such as, result 506. If result 506 is TRUE, action 504 may execute. If result 506 is FALSE, the action may be barred from execution and the system may enter another state, such as, state 508.

In at least one of the various embodiments, condition 502 may be a declarative expression arranged to match one or more facts that may be determined from monitoring network traffic flows and/or external metrics. For example, in at least one of the various embodiments, a condition may include an expression such as, "IP_Address in 198.168.1.0/25" for testing if an IP address is in the range of 198.168.1.0 through 198.168.1.127. Another example, in at least one of the various embodiments, a condition may include an expression such as "port='194'" for testing if a network connection is attempting to use a particular network port, such as, starting TCP/IP Internet Relay Chat (IRC) session, or the like.

In at least one of the various embodiments, one or more condition expressions may be combined together using various operators, such as, Boolean operators, set operators, comparisons, or the like. For example, in at least one of the various embodiments, a condition may be arranged to include "(IP_Address in 198,168.0/25) AND port='194'" which may be testing if IRC connections are on a local network subnet.

In at least one of the various embodiments, condition 502 may include declarative expressions that may be built up using one or more built-in values and operators. In at least one of the various embodiments, the built-in values (e.g., facts) may be used in condition expression. Such built-in values may include, VLAN id, source IP address, destination IP address, cache utilization, bandwidth utilization, or the like. In at least one of the various embodiments, a declarative policy engine such as policy engine 410 may be limited to offering a fixed set of declared values and operands for generating conditions used in policy rules.

In at least one of the various embodiments, condition 502 may be arranged to execute a one or more operations defined in a script implemented using functional programming and/or imperative programming. For example, in at least one of the various embodiments, condition 502 may be extended by arranging it to produce as result based on running one or more scripts that may be programmed in custom programming languages, JavaScript, Erlang, Java, C, C++, or the like. In at least one of the various embodiments, the condition may be associated with one or more scripts using attributes of the data structures used for implementing the policy rule, conditions, or the like.

In at least one of the various embodiments, the scripts used for extending condition 502 may be arranged to have visibility to network and system metrics that may be otherwise unavailable to the policy engine. In other words, the scripts may enable non-built-in values, facts, or operations, to be employed in condition 502. In at least one of the various embodiments, built-in values, or operations may be used in the scripts as well as non-built-in values, or operations.

In at least one of the various embodiments, script may be employed to modify operands and/or parameters before they are passed to the policy engine for processing. This type of processing may be used to compute operand/parameter values before they are passed to the policy engine for use in conditions. For example, a script may be arranged to rewrite a URI before it is passed to the policy engine for condition checking.

In at least one of the various embodiments, action 504 may be the one or more operations that may be triggered to occur if condition 502 is true. In at least one of the various embodiments, the policy engine may declare a fixed set up of built-in actions that may be taken if a condition evaluates to true. For example, in at least one of the various embodiments, if condition 502 defined as "IP_Address in 198, 168.0/25 AND port='194'" the corresponding action may be "discard packet" resulting in IRC connections attempts in the sub-net 198.168.1.0 through 198.168.1.127 being discarded.

In at least one of the various embodiments, similar to conditions, actions may also be extended using functional and/or imperative programming contained in scripts. For example, in at least one of the various embodiments, the example used above with condition "IP_Address in 198, 168.0/25 AND port='194'" may have its corresponding action extended to generate a particular log message when the condition is met. Thus, in at least one of the various embodiments, even declarative conditions using the built-in values, and operations that execute on the policy engine may perform actions based on script that use functional and/or imperative programming.

Also, in at least one of the various embodiments, one or more policy rules may be arranged into one r more policy rulesets. Rulesets may be arranged based on one or more considerations, such as, application type, network protocol type, user type, administrator prerogative, or the like. In at least one of the various embodiments, functional or imperative programming included in scripts may be used to determine which ruleset to associate with a given monitored event.

Generalized Operations

FIGS. 6-9 represent the generalized operations for extending policy rulesets with scripting in accordance with at least one of the various embodiments. In at least one of the various embodiments, processes 600, 700, 800 and 900 described in conjunction with FIGS. 6-9 may be implemented by and/or executed on a single network device, such as network device 300 of FIG. 3. In other embodiments, these processes or portions thereof may be implemented by and/or executed on a plurality of network devices, such as network device 300 of FIG. 3. However, embodiments are not so limited, and various combinations of network devices, client devices, virtual machines, or the like may be utilized. Further, in at least one of the various embodiments, the processes described in conjunction with FIGS. 6-9 may be operative in traffic management devices, systems, and architectures, such as, those described in conjunction with FIGS. 1-4.

Figure 6:
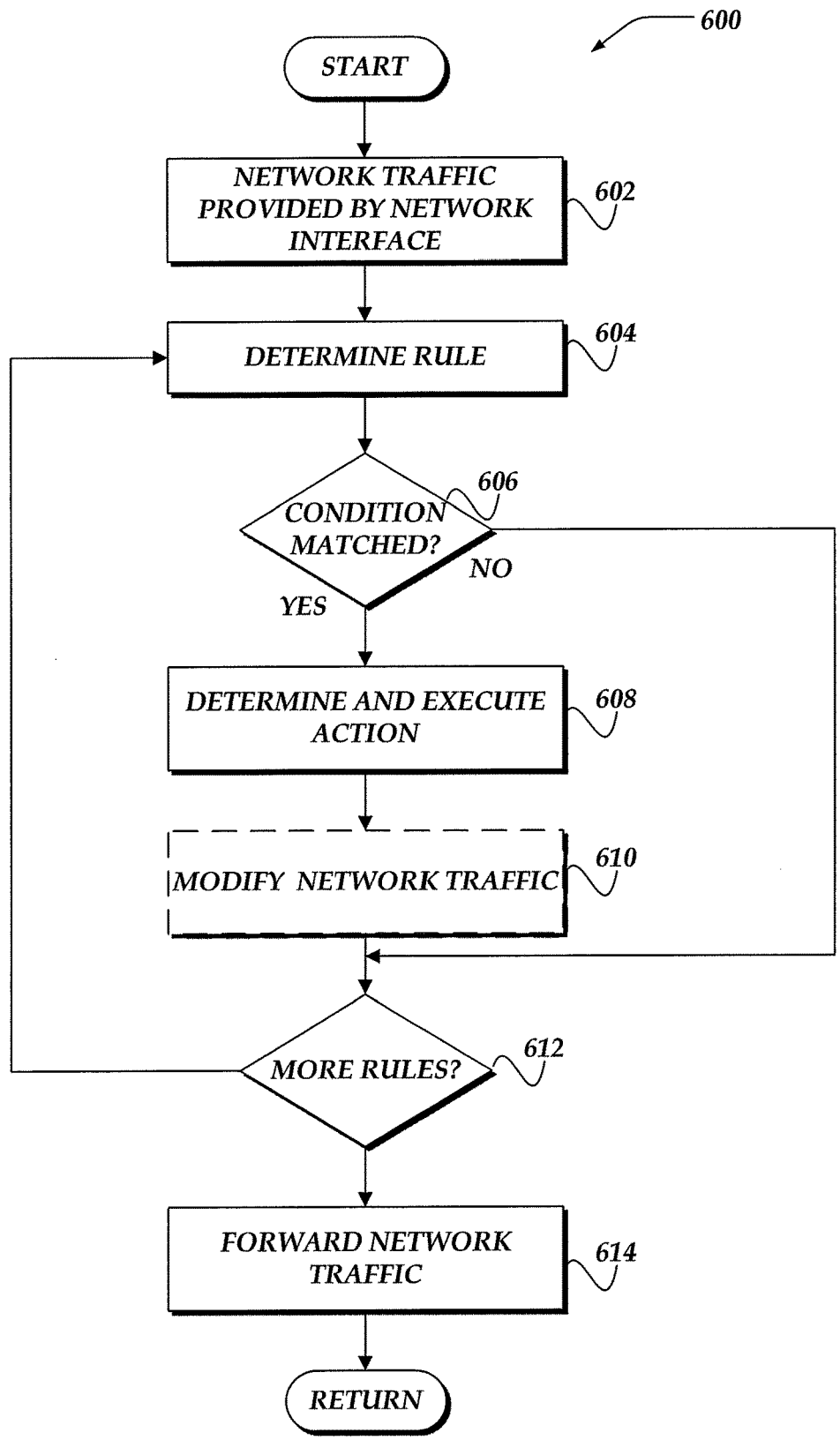
FIG. 6 shows a flowchart of an overview process for extending policy rulesets in accordance with at least one of the embodiments.

FIG. 6 shows a flowchart of process 600 for extending policy rulesets in accordance with at least one of the embodiments. After a start block, at block 602, in at least one of the various embodiments, network traffic may be provided by one or more network interfaces.

At block 604, in at least one of the various embodiments, the policy rule for processing the network traffic may be determined. In at least one of the various embodiments, the policy rules may be selected based on one or more attributes of the network traffic, such as, sender identity, destination identity, transmission speed, application type, or the like, or the combination thereof. Also, in at least one of the various embodiments, the rule may be determined in part by one or more external attributes, such as, time-of-day, availability of traffic manager device resources, or the like.

In at least one of the various embodiments, policy rules may be arranged into one or more rulesets that include one or more policy rules. Thus, in at least one of the various embodiments, the policy rules may be determined based on a determination of which policy ruleset may be in effect. In at least one of the various embodiments, determining which policy ruleset that may be in effect may use similar techniques and considerations as described for determining a policy rule.

At decision block 606, in at least one of the various embodiments, if a condition that is associated with the rule is matched, control may flow to block 608. Otherwise, in at least one of the various embodiments, control may flow to decision block 602.

At block 608, in at least one of the various embodiments, the action to take in response to matching the condition may be determined and executed.

At block 610, in at least one of the various embodiments, optionally, depending on the arrangement and configuration of the action, the network traffic may be modified based on the execution of the action.

In at least one of the various embodiments, the determined action may be arranged to modify and/or generate results beyond the network traffic. In at least one of the various embodiments, an action may be employed to change one or more operational/system attributes of the traffic management device. For example, the execution of an action may update values such as, timeout duration, cache allocations, routing/load balancing algorithms, or the like. Also, in at least one of the various embodiments, actions may include modifying network traffic, discarding data, logging information to log files, raising notifications, load balancing data, routing traffic, updating a database or a state table, or the like.

At decision block 612, in at least one of the various embodiments, if there are more rules to process, control may loop back to block 504. Otherwise, in at least one of the various embodiments, control may flow to block 614.

At block 614, in at least one of the various embodiments, the network traffic may be provided to a network interface and forwarded to its next destination. If the network traffic was modified in the step of block 610, the modified network traffic may be provided to a network interface and forwarded to its next destination. Next, in at least one of the various embodiments, control may be returned to a calling process.

Figure 7:
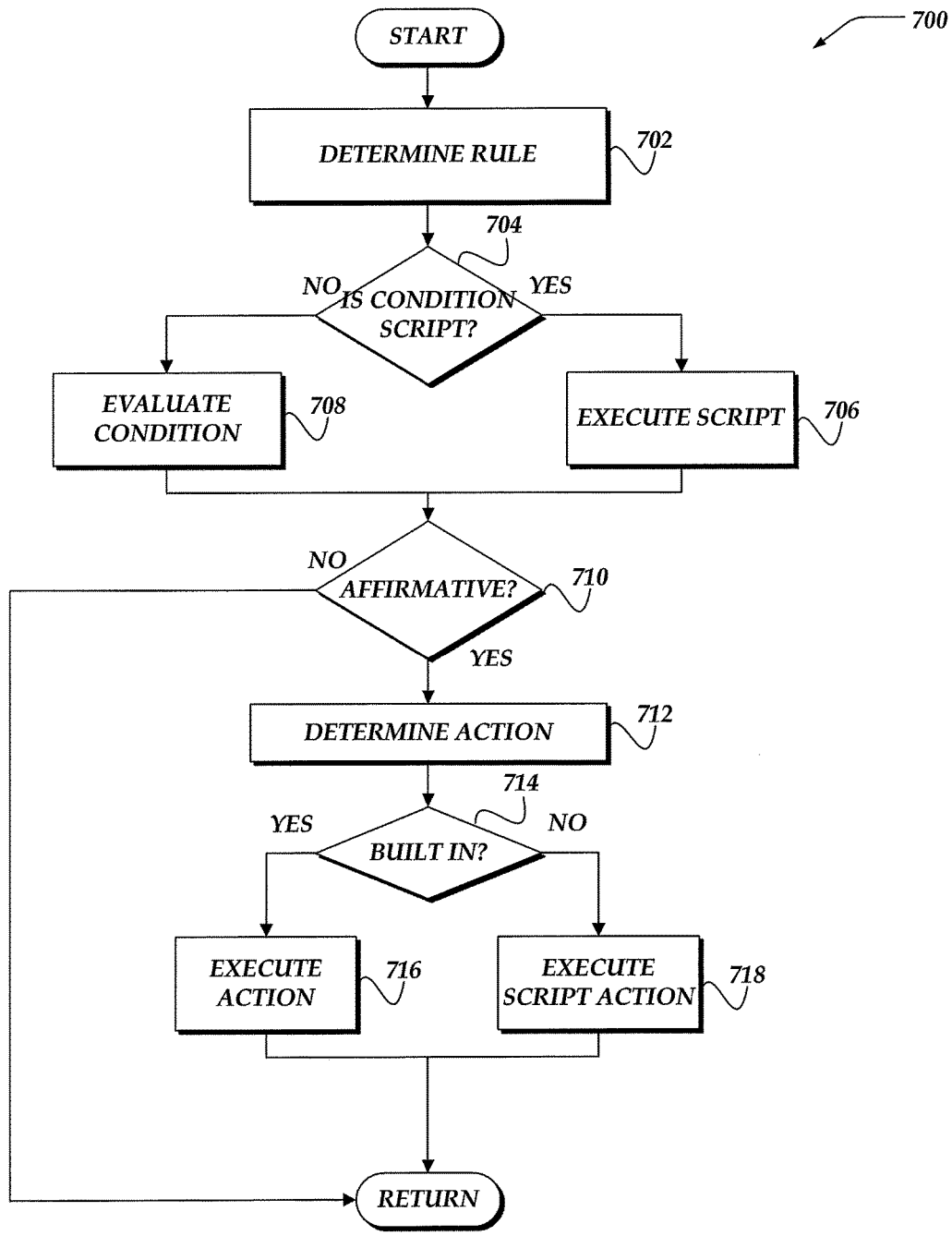
FIG. 7 shows a flowchart of a process for processing rulesets in accordance with at least one of the embodiments.

FIG. 7 shows a flowchart of process 700 for processing rulesets in accordance with at least one of the embodiments. After a start block, at block 702, in at least one of the various embodiments, the current rule may be determined from a ruleset.

At decision block 704, in at least one of the various embodiments, if the condition for the current rule is associated with a script, control may flow to block 706. Otherwise, in at least one of the various embodiments, control may flow to block 708.

In at least one of the various embodiments, various well-known programming techniques may be employed to indicate that a policy rule condition is associated with a script. For example, the data structures used to implement a policy rule may include attributes identify a script and how to locate/retrieve it.

At block 706, in at least one of the various embodiments, the script may be executed to produce an affirmative or negative result. In at least one of the various embodiments, the rule acts a conditional expression for determining if an action may be performed. Thus, in at least one of the various embodiments, the script employed at block 706 may be an arbitrarily complex script that produces an affirmative or negative (e.g., true or false) result. In at least one of the various embodiments, scripts used with conditions may include functional and/or imperative programming techniques (rather than just declarative programming) to produce true or false results.

At block 708, in at least one of the various embodiments, the rule may be evaluated by the declarative policy engine to produce an affirmative or negative result. In at least one of the various embodiments, since the rule is not associated with a script, the policy engine may evaluate the declarative condition using built-in values and operations.

At decision block 710, in at least one of the various embodiments, if the result is affirmative, control may flow to block 712; otherwise, additional rules, if any, from the ruleset may be evaluated. In at least one of the various embodiments, rules may be evaluated up until either an action has been determined, or all relevant rules have been evaluated. Next, in at least one of the various embodiments, control may be returned to a calling process.

In at least one of the various embodiments, conditions may act a guard the enable the action to fired only if the condition is met. In block 708 a declarative conditional may be evaluated to produced a true or false result. Likewise, the script executed at block 706 may be arranged to generate a true or false result. Cleary, one of ordinary skill in the art will appreciate the any sufficient to determine if the condition expression has be met may be sufficient, such as, true or false, 1 or 0, non-zero or zero, positive or negative, number ranges, or the like.

At block 712, in at least one of the various embodiments, since the conditions associated with the current have been met, an action may be determined, In at least one of the various embodiments, actions may be associate with a condition using one or more well-known programming techniques. In at least one of the various embodiments, the data structures used for implementing a policy rule may include attributes and properties for associating conditions with actions. In at least one of the various embodiments, the logic and data for execution actions may be stored in one or more locations, such as, in the policy rules data structure, in a database, in memory cache, or the like, or combination thereof.

At decision block 714, in at least one of the various embodiments, if the determined action is a built in action, such as, one that is fully implemented/provided by the core functionality, control may flow to block 716. Otherwise, in at least one of the various embodiments, control may flow to block 718.

At block 716, in at least one of the various embodiments, the action associated with the current rule may be executed. Next, in at least one of the various embodiments, control may be returned to a calling process.

In at least one of the various embodiments, built-in actions may be executed directly. Such actions may include, discarding packets, closing connections, redirectiing a network flow, or the like, or combination thereof.

At block 718, in at least one of the various embodiments, since the action associated with the rule is not a built in action, then a script associated with the current rule may be executed to perform the action. Next, in at least one of the various embodiments, control may be returned to a calling process.

Figure 8:
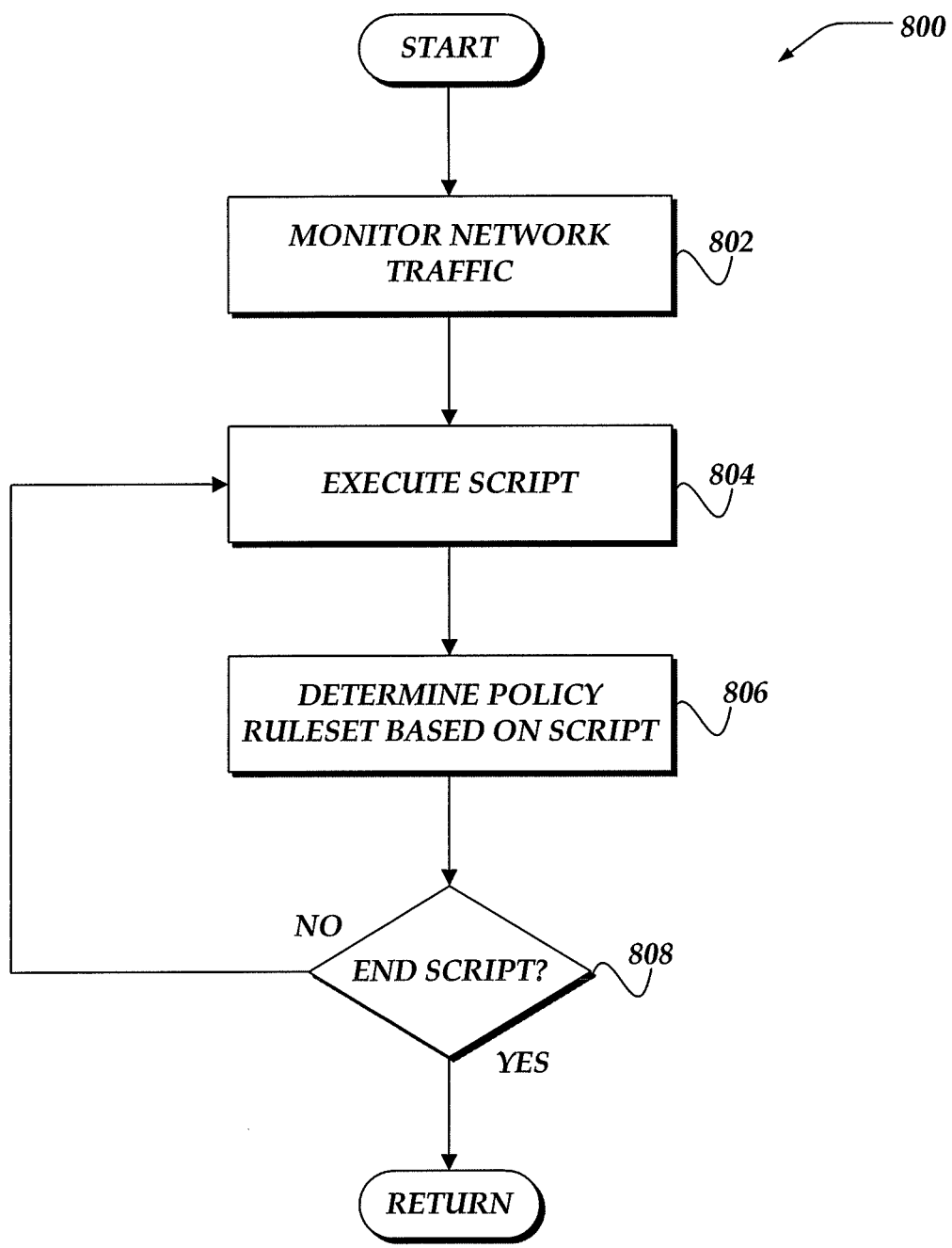
FIG. 8 shows a flowchart of a process for executing policy rulesets based on a script in accordance with at least one of the embodiments.

FIG. 8 shows a flowchart of process 800 for executing policy rulesets based on a script in accordance with at least one of the embodiments. After a start block, at block 802, network traffic may be monitored and/or analyzed by a network device, such as traffic management device 109.

At block 804, in at least one of the various embodiments, a policy script may be executed. In at least one of the various embodiments, the particular script to execute may be determined by configuration settings, including other policy rules. In at least one of the various embodiments, the script may be configured to process a portion of the network traffic that is flowing through the traffic management device. In at least one of the various embodiments, the portion of network traffic reaching a script may be controlled by another policy rule. For example, a rule may direct HTTP traffic to a particular script.

In at least one of the various embodiments, the script may be arranged to wake up if particular events are observed. Thus, the script may wake up, determine the appropriate policy ruleset and then go back to sleep leaving the policy engine to continue processing the network traffic until another of the particular events may be observed.

At block 806, in at least one of the various embodiments, one or more policy rulesets may be determined by the script that is executing. In at least one of the various embodiments, the script may use functional and/or imperative programming to tests for one or more conditions for determining a policy ruleset. For example, in at least one of the various embodiments, a traffic management device may be monitoring traffic from different network applications, such as, email, streaming videos, chat, voice data, or the like. And, in this example, each application may be assigned different and separate policy rulesets. Accordingly, if a new network flow is observed, the traffic management device may use imperative programming techniques in the script to determine which policy ruleset to associate with the new network flow. After the appropriate policy ruleset is determined, the network flow may be processed by the policy engine and the script (in block 804) may go into stand-by mode until another new connection may be detected.

At decision block 808, in at least one of the various embodiments, if the end of the script is reached, control may be returned to calling process. Otherwise, in at least one of the various embodiments, control may loop back to block 804.

In at least one of the various embodiments, as mentioned above, the script may return to idle and/or stand-by state until it may be activated. In at least one of the various embodiments, one or more events may be configured to trigger the script to wake up and process one or more network flows. Such events may include, new connections, device startup, new network packet, application events (e.g., HTTP's GET, POST, or the like), upon network flow classification, or the like.

Figure 9:
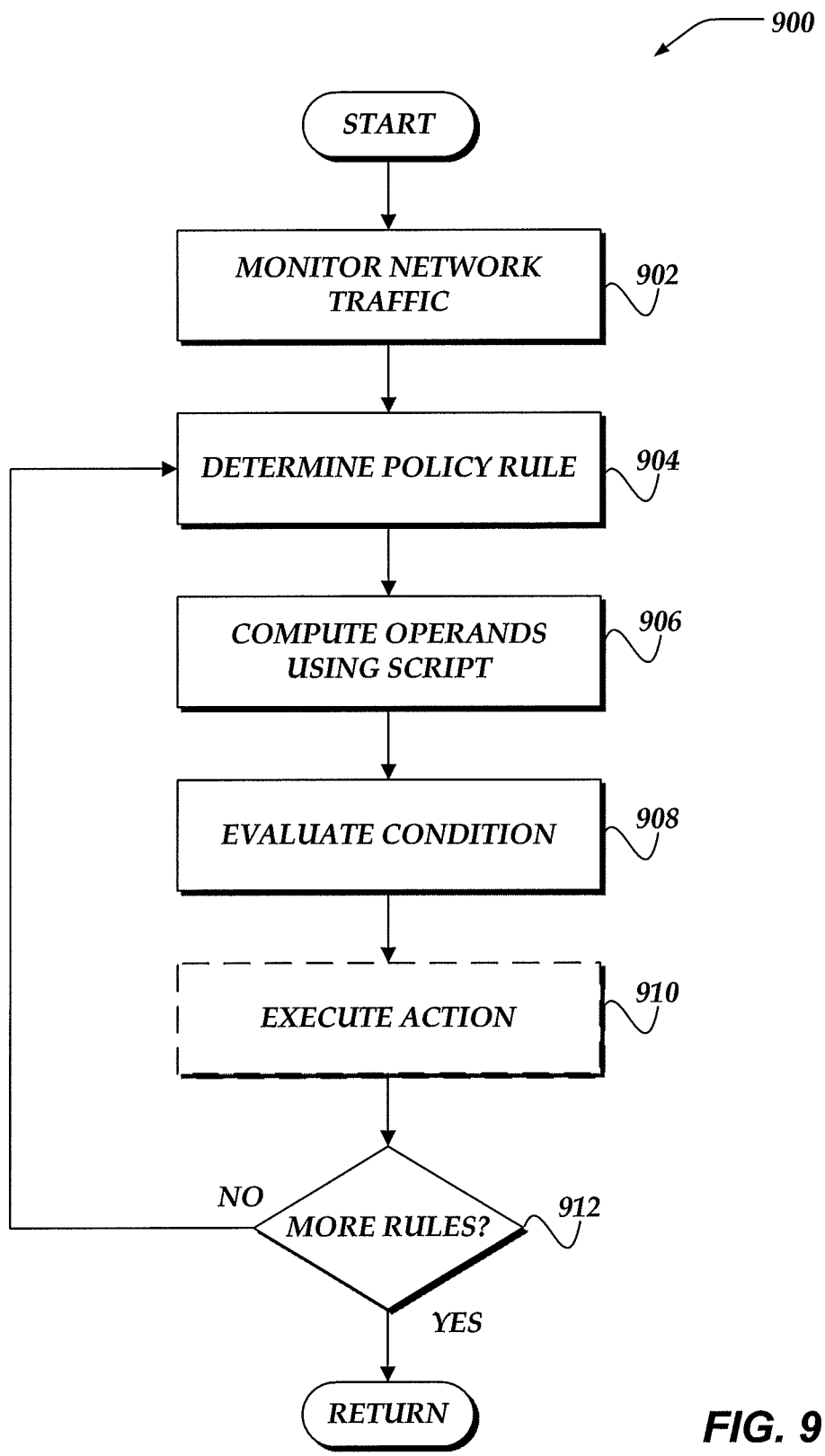
FIG. 9 shows a flowchart of a process for extending policy rulesets by computing operands using scripts in accordance with at least one of the embodiments.

FIG. 9 shows a flowchart of process 900 for extending policy rulesets by computing operands and/or parameters using scripts in accordance with at least one of the embodiments. After a start block, at block 902, network traffic may be monitored by process 900 running on network device, such as, packet management device 109.

At block 904, in at least one of the various embodiments, a policy rule may be determined. In at least one of the various embodiments, one or more the methods discussed above may be employed to determine the policy rule.

At block 906, in at least one of the various embodiments, the operands included in the determined policy rule may be computed using one or more scripts that may be associated with the determined policy rule. In at least one of the various embodiments, scripts may be implemented using one or more functional or imperative programming languages and/or techniques. Further, in at least one of the various embodiments, various well-known techniques may be employed for making the operands accessible with the context of the script, such as, passing them as name-value pairs, declaring using known reserved words, passing references to the operands, pushed into known registers, or the like, or combination thereof.

Likewise, in at least one of the various embodiments, the computed operands may be returned in a list of name-value pairs, modified directly using references (e.g., pointers), returned using a stack, or the like, or combination thereof.

At block 908, in at least one of the various embodiments, the condition for the policy rule may be evaluated using the relevant operands that may have been computed by the script in block 806. In at least one of the various embodiments, various methods may be employed to enable the condition to be evaluated using the computed operands. Programming techniques, such as those discussed above, may be employed to enable the process that is evaluating the condition to access the computed operands.

At block 910, in at least one of the various embodiments, optionally, one or more actions associated with the determine policy rule may be executed. In at least one of the various embodiments, process 900 may determine whether to execute the action based on the results of evaluating the condition for the determined rule. In at least one of the various embodiments, the action associated with the policy rule may also reference the operands computed at block 906. In at least one of the various embodiments, one or more of the techniques, or similar techniques, used for providing the operands to the condition may be employed to provide the operands to the action.

At decision block 912, in at least one of the various embodiments, if there are more policy rules to process, control may loop back to block 904. Otherwise, in at least one of the various embodiments, control may be returned to a calling process. Furthermore, in at least one of the various embodiments, process 900 may be arranged to concurrently process multiple policy rules.

It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of machine readable storage media, such as processor readable non-transitive storage media, or the like.

Illustrative Use Case

Figure 10:
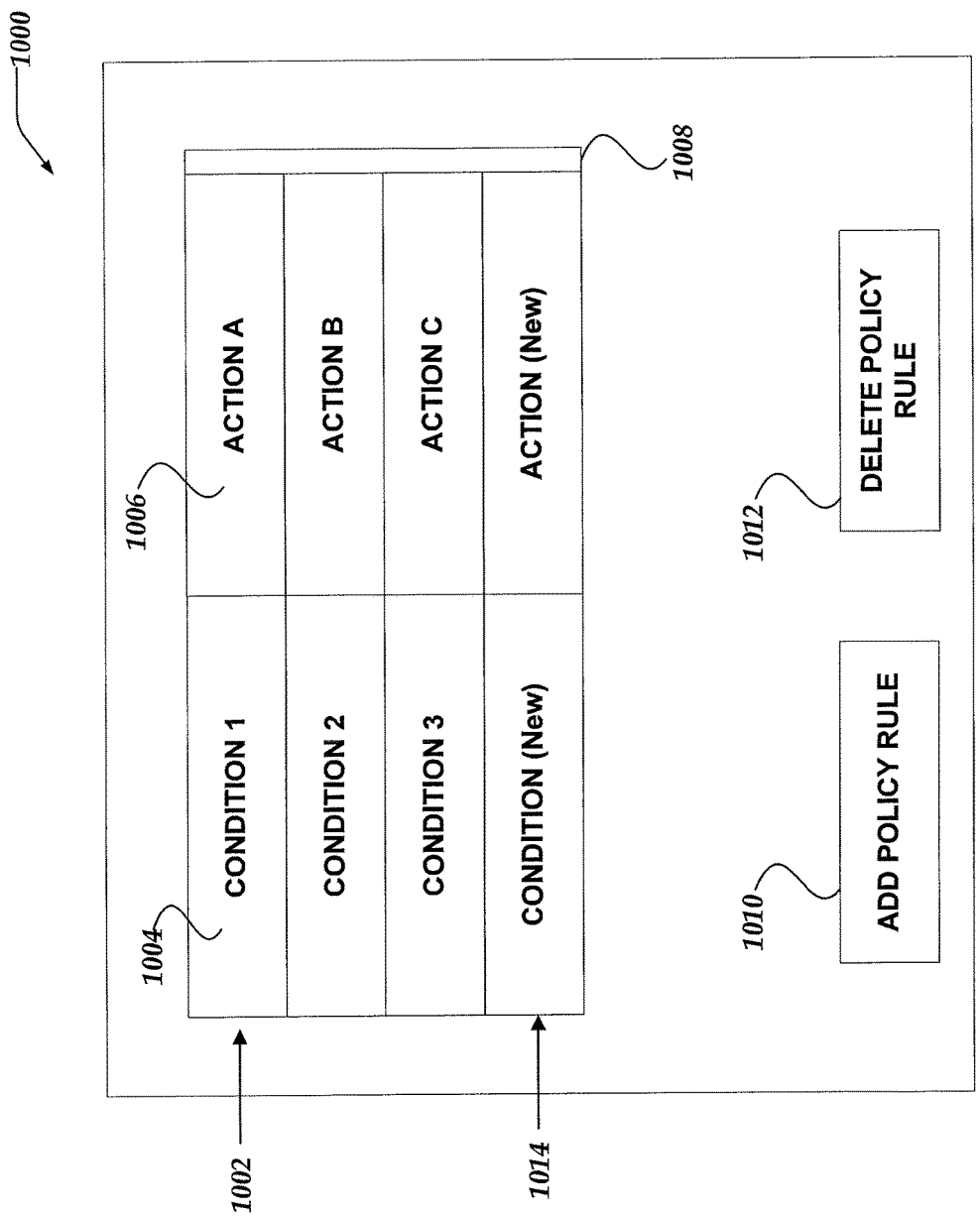
FIG. 10 illustrates a user-interface for working with policy rules in accordance with at least one of the various embodiments.

FIG. 10 shows user-interface 1000 that is illustrative of using scripts to extend policy rulesets in accordance with at least one of the various embodiments. In at least one of the various embodiments, policy rule 1002 may be displayed using a set of rows in a user-interface. In at least one of the various embodiments, each policy rule in each row may include conditions and actions, such as, condition 1004 and action 1006. Further, in at least one of the various embodiments, if there may be more policy rules than can be displayed at one time, a user-interface control, such as scroll-bar 1008 may be arranged to enable a user to display additional policy rules. For example, a user may employ a pointing device to use scrollbar 1008 to view other policy rules that otherwise may not be visible in the displayed portion of the user-interface.

In at least one of the various embodiments, button 1010 may be employed to generate a new policy rule. In at least one of the various embodiments, if a user selects/presses button 1010, a user-interface that enables a new policy rule to be created may be display. In at least one of the various embodiments, an empty or otherwise un-configured row in the policy rule user-interface may be generated and displayed to the user, such as, policy rule 1014. In at least one of the various embodiments, users may use pointing device to select a policy rules conditions and/or action to enable a user-interface for additional configuration. (See FIG. 11).

Figure 11:
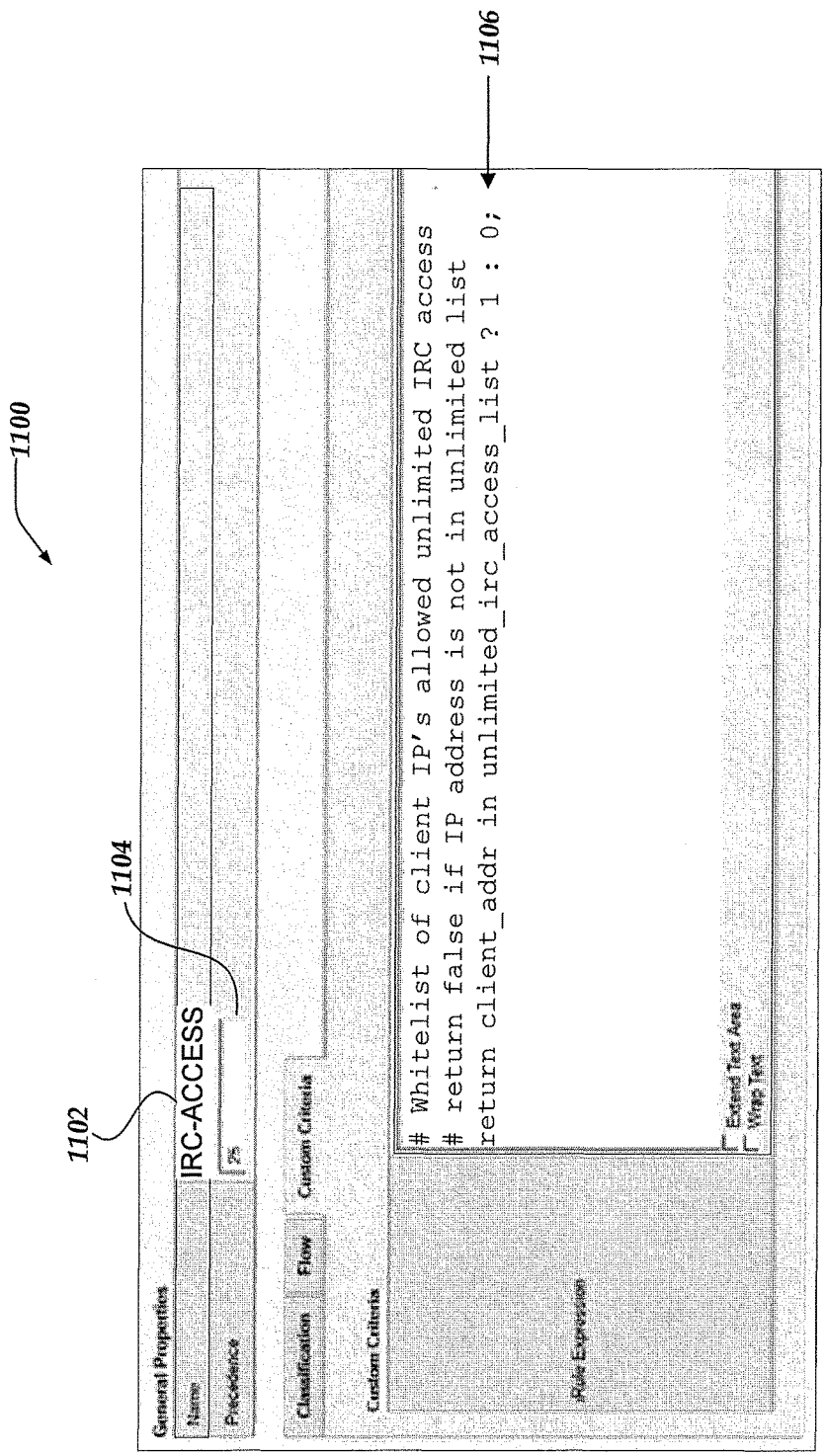
FIG. 11 illustrates a user-interface for extending a policy rule using scripting in accordance with at least one of the various embodiments.

FIG. 11 shows user-interface 1100 for generating a script for extending a policy rule in accordance with at least one of the various embodiments. In at least one of the various embodiments, user interface may be arranged to enable users to generate scripts for extending policy rules. In at least one of the various embodiments, user-interface 1100 may include information that identifies the policy rule in terms that are user friendly. For example, field 1102 may be used for display a human readable name of the policy rule. In this example, the rule may be related to Internet Relay Chat (IRC) so its name has been chosen to reflect the purpose of the policy rule.

In at least one of the various embodiments, policy rules may have a defined precedence within a ruleset. In at least one of the various embodiments, field 1104 may be arranged to receive a precedence value for the policy rule. In this example, this policy rule has been assigned a precedence value of 25 as shown in field 1104.

In at least one of the various embodiments, the script used for extending the policy rules may be entered directly into a user-interface by using a text-area control, such as, text area control 1106. In this example, the script source code, including comments is entered directly using text area control 1106. In this non-limiting example, the script may be interpreted as follows: if a client IP address associated with a network flow is in the list of network addresses (unlimited_irc_access) a one (1) is returned representing a result of TRUE; otherwise zero (0) is returned representing a result of FALSE. Of course, scripts are not limited to the example shown here. Likewise, in at least one of the various embodiments, scripts may be arbitrarily complex having many lines of source if needed. Further, as described above, scripts may be written using various programming and scripting languages and are not limited by the example shown in FIG. 11.

What is claimed is:

1. A method for managing communication over a network with a network device including one or more processors that perform operations, comprising:
provide, by the one or more processors, a first policy rule from a plurality of policy rules based in part on a policy engine and at least one characteristic of the managed communication, wherein the policy engine is configured and arranged to evaluate declarative expressions included in the plurality of policy rules;
provide, by the one or more processors, a condition that corresponds to the first policy rule;
in response to a script included with the condition, instantiating, by the one or more processors, a script engine to execute and wake up the script, wherein content of the script is employed to determine, for the first policy rule, one or more operands that are used to evaluate when the condition is met, wherein the script engine operates separate from the policy engine, and wherein after the script is executed, the script is placed in a sleep mode; and
in response to selecting the first policy rule for extension, employing a user interface to extend the first policy rule by inclusion of the content of the script, wherein subsequent use of the extended first policy rule evaluates the included declarative expressions and also executes the content of the script; and
employing the policy engine to perform actions, including:
employing the met condition to perform further operations, including:
provide, by the one or more processors, management of the network communication, wherein providing the management of the network communication employs a second policy rule, wherein the second policy rule is determined from the plurality of policy rules based on the script that is executed by the script engine;
provide, by the one or more processors, an action that corresponds to the first policy rule; and
execute, by the one or more processors, the action corresponding to the first policy rule on the provided managed network communication.

2. The method of claim 1, further comprising:
provide, by the one or more processors, at least one operand using an operand script; and
provide, by the one or more processors, the at least one operand to the condition.

3. The method of claim 1, wherein executing the provided action corresponding to the first policy rule, further comprises, when the provided action includes an action script, employing the script engine to execute the provided action on the script engine.

4. The method of claim 1, further comprising, when the condition includes a declarative expression, by the one or more processors, perform one or more operations to test when the condition is met using the policy engine.

5. The method of claim 1, further comprising, provide, by the one or more processors, the plurality of policy rules that includes another script that is running separate from the policy engine.

6. The method of claim 1, further comprising, display, by one or more of the processors, policy rules in a user-interface, wherein a portion of the policy rules are displayed in rows with one column for the condition and one column for the corresponding action.

7. The method of claim 1, wherein the script is comprised of at least one of, JavaScript, Perl, Python, Lua, C, C++, Tcl, custom programming languages, or C#.

8. A network device for managing communication over a network, comprising:
a transceiver for communicating over the network;
a memory for storing at least instructions;
one or more processors that execute instructions to perform operations, including:
provide, by the one or more processors, a first policy rule from a plurality of policy rules based in part on a policy engine and at least one characteristic of the managed communication, wherein the policy engine is configured and arranged to evaluate declarative expressions included in the plurality of policy rules;
provide, by the one or more processors, a condition that corresponds to the first policy rule;
in response to a script included with the condition, instantiating, by the one or more processors, a script engine to execute and wake up the script, wherein content of the script is employed to determine, for the first policy rule, one or more operands that are used to evaluate when the condition is met, wherein the script engine operates separate from the policy engine, and wherein after the script is executed, the script is placed in a sleep mode; and
in response to selecting the first policy rule for extension, employing a user interface to extend the first policy rule by inclusion of the content of the script, wherein subsequent use of the extended first policy rule evaluates the included declarative expressions and also executes the content of the script; and
employing the policy engine to perform actions, including:
employing the met condition to perform further operations, including:
provide, by the one or more processors, management of the network communication, wherein providing the management of the network communication employs a second policy rule, wherein the second policy rule is determined from the plurality of policy rules based on the script that is executed by the script engine;

provide, by the one or more processors, an action that corresponds to the first policy rule; and execute, by the one or more processors, the action corresponding to the first policy rule on the provided managed network communication.

9. The network device of claim 8, further comprising:
provide, by the one or more processors, at least one operand using an operand script; and
provide, by the one or more processors, the at least one operand to the condition.

10. The network device of claim 8, wherein executing the provided action corresponding to the first policy rule, further comprises, when the provided action includes an action script, employing the script engine to execute the provided action on the script engine.

11. The network device of claim 8, further comprising, when the condition includes a declarative expression, by the one or more processors, perform one or more operations to test when the condition is met using the policy engine.

12. The network device of claim 8, further comprising, provide, by the one or more processors, the plurality of policy rules that includes another script that is running separate from the policy engine.

13. The network device of claim 8, further comprising, display, by one or more of the processors, policy rules in a user-interface, wherein a portion of the policy rules are displayed in rows with one column for the condition and one column for the corresponding action.

14. The network device of claim 8 wherein the script is comprised of at least one of, JavaScript, Perl, Python, Lua, C, C++, Tcl, custom programming languages, or C#.

15. A processor readable non-transitive storage media that includes instructions for managing communication over a network, wherein execution of the instructions by one or more processors included in a network device perform operations, comprising:

provide, by the one or more processors, a first policy rule from a plurality of policy rules based in part on a policy engine and at least one characteristic of the managed communication, wherein the policy engine is configured and arranged to evaluate declarative expressions included in the plurality of policy rules;

provide, by the one or more processors, a condition that corresponds to the first policy rule;

in response to a script included with the condition, instantiating, by the one or more processors, a script engine to execute and wake up the script, wherein content of the script is employed to determine, for the first policy rule, one or more operands that are used to evaluate when the condition is met, wherein the script engine operates separate from the policy engine, and wherein after the script is executed, the script is placed in a sleep mode; and in response to selecting the first policy rule for extension, employing a user interface to extend the first policy rule by inclusion of the content of the script, wherein subsequent use of the extended first policy rule evaluates the included declarative expressions and also executes the content of the script; and employing the policy engine to perform actions, including:
employing the met condition to perform further operations, including:

provide, by the one or more processors, management of the network communication, wherein providing the management of the network communication employs a second policy rule, wherein the second policy rule is determined from the plurality of policy rules based on the script that is executed by the script engine;

provide, by the one or more processors, an action that corresponds to the first policy rule; and execute, by the one or more processors, the action corresponding to the first policy rule on the provided managed network communication.

16. The media of claim 15, further comprising:
provide, by the one or more processors, at least one operand using an operand script; and
provide, by the one or more processors, the at least one operand to the condition.

17. The media of claim 15, wherein executing the provided action corresponding to the first policy rule, further comprises, when the provided action includes an action script, employing the script engine to execute the provided action on the script engine.

18. The media of claim 15, further comprising, when the condition includes a declarative expression, by the one or more processors, perform one or more operations to test when the condition is met using the policy engine.

19. The media of claim 15, further comprising, provide, by the one or more processors, the plurality of policy rules that includes another script that is running separate from the policy engine.

20. The media of claim 15, further comprising, display, by one or more of the processors, policy rules in a user-interface, wherein a portion of the policy rules are displayed in rows with one column for the condition and one column for the corresponding action.

21. The media of claim 15, wherein the script is comprised of at least one of, JavaScript, Perl, Python, Lua, C, C++, Tcl, custom programming languages, or C#.

22. A system arranged for managing communication over a network, comprising:
a server device, including:
a transceiver for communicating over the network;
a memory for storing at least instructions;
one or more processors that execute instructions to perform operations, including:
provide, by the one or more processors, a first policy rule from a plurality of policy rules based in part on a policy engine and at least one characteristic of the managed communication, wherein the policy engine is configured and arranged to evaluate declarative expressions included in the plurality of policy rules;
provide, by the one or more processors, a condition that corresponds to the first policy rule;
in response to a script included with the condition, instantiating, by the one or more processors, a script engine to execute and wake up the script, wherein content of the script is employed to determine, for the first policy rule, one or more operands that are used to evaluate when the condition is met, wherein the script engine operates separate from the policy engine, and wherein after the script is executed, the script is placed in a sleep mode; and
in response to selecting the first policy rule for extension, employing a user interface to extend the first policy rule by inclusion of the content of the script, wherein subsequent use of the extended first policy rule evaluates the included declarative expressions and also executes the content of the script; and employing the policy engine to perform actions, including:

employing the met condition to perform further operations, including:

provide, by the one or more processors, management of the network communication, wherein providing the management of the network communication employs a second policy rule, wherein the second policy rule is determined from the plurality of policy rules based on the script that is executed by the script engine;

provide, by the one or more processors, an action that corresponds to the first policy rule; and execute, by the one or more processors, the action corresponding to the first policy rule on the provided managed network communication; and a client device, comprising, a transceiver that is operative to communicate over the network;

a memory that is operative to store at least instructions; and one or more processors that execute instructions to perform operations, including:

providing communications to the network device.

23. The system of claim 22, further comprising:

provide, by the one or more processors, at least one operand using an operand script; and provide, by the one or more processors, the at least one operand to the condition.

24. The system of claim 22, wherein executing the provided action corresponding to the first policy rule, further comprises, when the provided action includes an action script, employing the script engine to execute the provided action on the script engine.

25. The system of claim 22, further comprising, when the condition includes a declarative expression, by the one or more processors, perform one or more operations to test when the condition is met using the policy engine.

26. The system of claim 22, further comprising, provide, by the one or more processors, the plurality of policy rules that includes another script that is running separate from the policy engine.

27. The system of claim 22, further comprising, display, by one or more of the processors, policy rules in a user-interface, wherein a portion of the policy rules are displayed in rows with one column for the condition and one column for the corresponding action.

28. The system of claim 22, wherein the script is comprised of at least one of, JavaScript, Perl, Python, Lua, C, C++, Tcl, custom programming languages, or C#.

* * * * *